(12) United States Patent
Kripalani et al.

(10) Patent No.: US 11,474,984 B2
(45) Date of Patent: *Oct. 18, 2022

(54) DIFFERENTIAL HEALTH CHECKING OF AN INFORMATION MANAGEMENT SYSTEM

(71) Applicant: Commvault Systems, Inc., Tinton Falls, NJ (US)

(72) Inventors: Sanjay Harakhchand Kripalani, Morganville, NJ (US); Parag Gokhale, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/197,582

(22) Filed: Mar. 10, 2021

(65) Prior Publication Data
US 2021/0209074 A1 Jul. 8, 2021

Related U.S. Application Data

(63) Continuation of application No. 16/530,847, filed on Aug. 2, 2019, now Pat. No. 10,977,225, which is a (Continued)

(51) Int. Cl.
*H04L 12/24* (2006.01)
*H04L 41/0803* (2022.01)
(Continued)

(52) U.S. Cl.
CPC ............ *G06F 16/215* (2019.01); *G06F 11/00* (2013.01); *G06F 11/1456* (2013.01);
(Continued)

(58) Field of Classification Search
CPC ............... G06F 16/215; G06F 11/1456; G06F 11/3034; G06F 11/3485; G06F 11/34;
(Continued)

(56) References Cited

U.S. PATENT DOCUMENTS

| | | |
|---|---|---|
| 4,084,231 A | 4/1978 | Capozzi et al. |
| 4,267,568 A | 5/1981 | Dechant et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

Arneson, "Mass Storage Archiving in Network Environments" IEEE, Oct. 31-Nov. 1998, pp. 45-50.

(Continued)

*Primary Examiner* — Yves Dalencourt
*Assistant Examiner* — Elizabeth Kassa
(74) *Attorney, Agent, or Firm* — Commvault Systems, Inc.

(57) ABSTRACT

Differential health-check systems and accompanying methods provide health-checking and reporting of one or more information management systems in reference to a first time period before and a second time period after a triggering event. A triggering event may be an upgrade of at least part of the information management system, or a restore operation completed in the information management system for example following a disaster, or any number of other events, etc. The health-checking and reporting may comprise a comparison of one or more performance metrics of one or more components and/or operations of the information management system during the first and second time periods.

20 Claims, 16 Drawing Sheets

Related U.S. Application Data continuation of application No. 15/897,017, filed on Feb. 14, 2018, now Pat. No. 10,437,801, which is a continuation of application No. 15/400,830, filed on Jan. 6, 2017, now Pat. No. 9,928,258, which is a continuation of application No. 14/069,745, filed on Nov. 1, 2013, now Pat. No. 9,590,886.

(51) Int. Cl.

| | |
|---|---|
| *G06F 16/215* | (2019.01) |
| *G06F 11/34* | (2006.01) |
| *G06F 11/14* | (2006.01) |
| *G06F 11/30* | (2006.01) |
| *H04L 43/10* | (2022.01) |
| *G06F 11/00* | (2006.01) |
| *H04L 67/1097* | (2022.01) |
| *G06F 11/32* | (2006.01) |

(52) U.S. Cl.
CPC ........ *G06F 11/302* (2013.01); *G06F 11/3034* (2013.01); *G06F 11/34* (2013.01); *G06F 11/3485* (2013.01); *H04L 43/10* (2013.01); *H04L 67/1097* (2013.01); *G06F 11/1469* (2013.01); *G06F 11/32* (2013.01); *G06F 11/3409* (2013.01); *G06F 2201/88* (2013.01)

(58) Field of Classification Search
CPC .... G06F 11/302; G06F 11/00; G06F 2201/88; G06F 11/32; G06F 11/1469; G06F 11/3409; H04L 67/1097; H04L 43/10
USPC ........................................................ 709/224
See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,502,133 B1 | 12/2002 | Baulier |
| 6,542,972 B2 | 4/2003 | Ignatius et al. |
| 6,658,436 B2 | 12/2003 | Oshinsky et al. |
| 6,691,244 B1 | 2/2004 | Kampe et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,703,091 B1 | 4/2010 | Martin et al. |
| 8,229,954 B2 | 7/2012 | Kottomtharayil et al. |
| 8,261,122 B1* | 9/2012 | Kappel ............... G06F 11/1402 714/2 |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,578,120 B2 | 11/2013 | Attarde et al. |
| 8,620,925 B1 | 12/2013 | Grube et al. |
| 9,928,258 B2 | 3/2018 | Kripalani et al. |
| 10,437,801 B2 | 10/2019 | Kripalani et al. |
| 10,977,225 B2 | 4/2021 | Kripalani et al. |
| 2006/0053263 A1* | 3/2006 | Prahlad ................ G06F 3/0605 711/162 |
| 2006/0224846 A1 | 10/2006 | Amarendran et al. |
| 2007/0185852 A1 | 8/2007 | Erofeev |
| 2007/0185937 A1 | 8/2007 | Prahlad |
| 2007/0198797 A1* | 8/2007 | Kavuri .................... G06F 3/061 711/165 |
| 2009/0319534 A1 | 12/2009 | Gokhale |
| 2010/0011022 A1 | 1/2010 | Sugimoto et al. |
| 2010/0070725 A1 | 3/2010 | Prahlad |
| 2010/0229166 A1 | 9/2010 | Mopur et al. |
| 2011/0023021 A1 | 1/2011 | Miyazaki et al. |
| 2012/0036109 A1 | 2/2012 | Blazejewski et al. |
| 2012/0072695 A1 | 3/2012 | Kottomtharayil et al. |
| 2012/0124308 A1 | 5/2012 | Harris, Jr. |
| 2012/0150818 A1 | 6/2012 | Vijayan Retnamma et al. |
| 2012/0150826 A1 | 6/2012 | Vijayan Retnamma et al. |
| 2012/0150949 A1 | 6/2012 | Vijayan Retnamma et al. |
| 2012/0191670 A1 | 7/2012 | Kennedy et al. |
| 2014/0188804 A1 | 7/2014 | Gokhale et al. |
| 2014/0188812 A1 | 7/2014 | Vijayan |
| 2014/0337662 A1 | 11/2014 | Gokhale et al. |
| 2015/0127804 A1 | 5/2015 | Kripalani et al. |
| 2015/0127995 A1 | 5/2015 | Kripalani et al. |
| 2020/0026693 A1 | 1/2020 | Kripalani et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| GB | 2409553 | 6/2005 |
| GB | 2410106 | 7/2005 |
| GB | 2425199 | 10/2006 |
| GB | 2435756 | 9/2007 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

Case No. 6:21-CV-00634-ADA, Answer WDTX-6-21-cv-00634-19, filed Aug. 27, 2021, in 23 pages.

Case No. 1:21-cv-00537, Complaint WDTX-1-21-cv-00537-1_WDTX-6-21-cv-00634-1, filed Jun. 18, 2021, in 44 pages.

(56) References Cited

OTHER PUBLICATIONS

Case No. 6:21-cv-00634-ADA, Order Dismissing with Prejudice WDTX-6-21-cv-00634-22, filed Sep. 1, 2021, in 1 page.

* cited by examiner

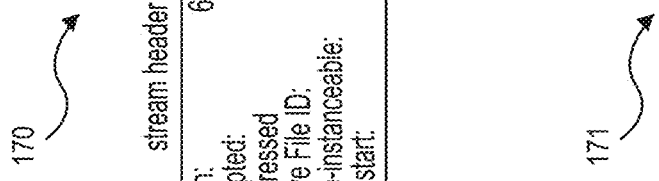

DIFFERENTIAL HEALTH CHECKING OF AN INFORMATION MANAGEMENT SYSTEM

INCORPORATION BY REFERENCE TO ANY PRIORITY APPLICATIONS

This application is a Continuation of U.S. patent application Ser. No. 16/530,847 filed on Aug. 2, 2019 which is a Continuation of U.S. patent application Ser. No. 15/897,017 filed on Feb. 14, 2018 and entitled "Differential Health Checking Of An Information Management System," now U.S. Pat. No. 10,437,801, which is a Continuation of U.S. patent application Ser. No. 15/400,830 filed on Jan. 6, 2017 and entitled "Differential Health Checking Of An Information Management System" now U.S. Pat. No. 9,928,258, which is a Continuation of U.S. Pat. No. 9,590,886 B2 filed on Nov. 1, 2013 and entitled "Systems and Methods for Differential Health Checking of an Information Management System." Any and all applications for which a foreign or domestic priority claim is identified in the Application Data Sheet of the present application are hereby incorporated by reference in their entireties under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are in increasing demand.

SUMMARY

A differential health-check system and accompanying methods provide health-checking and reporting on the performance of one or more information management systems in reference to a first time period before and a second time period after a triggering event. A triggering event may be an upgrade of all or part of the information management system, or a restore operation completed in the information management system such as following a disaster, or any number of other events, etc. The health-checking and reporting may comprise a comparison of one or more performance metrics of one or more components and/or operations of the information management system during the first and second time periods.

An illustrative embodiment comprises a differential health-check module that communicates electronically with a storage manager that manages an information management system. In some embodiments the differential health-check module resides apart from and operates separately from the storage manager; in some embodiments the storage manager comprises the differential health-check module. In some embodiments, the storage manager provides the component-specific information needed by the health-check module to perform its differential health-check analysis; in some embodiments, the storage manager obtains the information from the targeted component (or from an associated index or other data structure) after receiving a request from the health-check module; in some embodiments, the storage manager obtains and/or pre-processes the information from the targeted component (or from an associated index or other data structure) in anticipation of information-request queries issued by the health-check module to the storage manager.

Exemplary components of the information management system whose performance is health-checked include data agents and media agents, primary and secondary storage computing devices, primary and secondary storage devices, and storage manager(s), and/or individual components thereof, without limitation. Information about these components may be obtained from the component itself or from associated indexes or other data structures that store relevant information.

An illustrative method according to an exemplary embodiment comprises: identifying, by a differential health-check module, a first time period wherein a first component in an information management system operated, at least in part, under the control of a storage manager; identifying, by the differential health-check module, a second time period that follows the first time period, wherein the first component operated, at least in part, under the control of the storage manager; evaluating, by the differential health-check module, a first value of a first performance metric for the first component operating in the first time period, wherein the first value is based on information provided by the storage manager; evaluating, by the differential health-check module, a second value of the first performance metric for the first component operating in the second time period, wherein the second value is based on information provided by the storage manager; generating, by the differential health-check module, an indication to a user of a comparison of the second value of the first performance metric to the first value of the first performance metric; and wherein the first time period occurs before at least part of the information management system undergoes an upgrade, and further wherein the second time period occurs after the upgrade is completed. In some embodiments, the information provided by the storage manager is obtained from data stored in the storage manager. In some embodiments, the differential health-check module detects a change in performance of the first component in the second time period, based at least in part on the comparison. In some embodiments, the change in performance is evaluated based on a threshold value that is component-specific. In some embodiments, the method further comprises one or more of: requesting, by the differential health-check module before the upgrade is completed, pre-upgrade information about the information management system; and/or receiving, by the differential health-check module before the upgrade is completed, pre-upgrade information about the information management system from the storage manager; and/or receiving before the upgrade is completed, by a server that is remote from the differential health-check module, information about the information management system. In some embodiments, the upgrade comprises one or more of the following aspects: updating software that is associated with the information management system in one or more components of a primary storage subsystem in the information management system; and/or updating software that is associated with the information management system in one or more components of a secondary storage subsystem in the information management system; and/or updating software that is associated with the information management system in the storage manager; and/or updating hardware in one or more components of a secondary storage subsystem in the information management system; and/or replacing one or more components of a secondary storage subsystem in the information management system and/or adding one or more components to a primary storage subsystem in the information management system; and/or adding one or more components to a secondary storage subsystem in the information management system, etc. without limitation.

Another exemplary method comprises: receiving, by a storage manager from a differential health-check module, one or more queries for information about a first component of an information management system that operates at least in part under the control of the storage manager, wherein the queried information is in reference to operations of the first component during a first time period and during a second time period; extracting, by the storage manager in response to the one or more queries, information from the first component; generating by the storage manager, based at least in part on the extracted information, one or more responses that are responsive to the one or more received queries; transmitting the one or more responses to the differential health-check module; and wherein the first time period occurs before at least part of the information management system undergoes an upgrade, and further wherein the second time period occurs after the upgrade is completed. The method may further comprise pre-extracting, by the storage manager in anticipation of the one or more queries, some information from one or more components in the information management system, wherein the one or more responses are also based on the pre-extracted information, and other aspects, without limitation.

Another exemplary method comprises: pre-processing, by a storage manager, in anticipation of a query from a differential health-check module, some information extracted by the storage manager from a first component of an information management system, wherein the first component operates at least in part under the control of the storage manager; receiving, by the storage manager from the differential health-check module, one or more queries for information about the first component, wherein the queried information is in reference to operations of the first component during a first time period and during a second time period; generating by the storage manager, based at least in part on the pre-processed information, one or more responses to the one or more received queries; transmitting the one or more responses to the differential health-check module; and wherein the first time period occurs before at least part of the information management system undergoes an upgrade, and further wherein the second time period occurs after the upgrade is completed. In some embodiments, the extracted information is extracted by the storage manager from the first component before receiving the one or more queries.

An illustrative differential health-check system according to an exemplary embodiment comprises a differential health-check module that is configured to: communicate electronically with a storage manager that manages an information management system; receive a request for a differential health-check report having a report timeframe; define a first time period and a second time period based on the report timeframe, wherein the first time period occurs before at least part of the information management system undergoes an upgrade, and wherein the second time period occurs after the upgrade is completed; generate one or more queries for the storage manager, the queries comprising requests for information about a first component of the information management system operating during the first time period and during the second time period; evaluate a first value of a first performance metric for the first component operating in the first time period, based on information received from the storage manager in response to the one or more queries; evaluate a second value of the first performance metric for the first component operating in the second time period, based on information provided by the storage manager in response to the one or more queries; and generate an indication to the user of a change in performance of the first component in the second time period, based at least in part on comparing the second value of the first performance metric to the first value of the first performance metric.

Another illustrative system comprises a storage manager, wherein an information management system operates under the control of the storage manager; a differential health-check component that is configured to define, based on a request for a differential health-check report having a report timeframe that includes an event boundary, a first time period before the event boundary and a second time period after the event boundary, wherein the first time period occurs before at least part of the information management system undergoes an upgrade, and wherein the second time period occurs after the upgrade is completed; wherein the differential health-check component is further configured to receive, from the storage manager, information about a first component of the information management system operating during the first time period and during the second time period; wherein the differential health-check component is further configured to evaluate (i) a first value of a first performance metric for the first component operating in the first time period, based on information received from the storage manager, and (ii) a second value of the first performance metric for the first component operating in the second time period, based on information received from the storage manager; and wherein the differential health-check component is further configured to generate the differential health-check report for the user, based at least in part on comparing, by the differential health-check component, the second value of the first performance metric to the first value of the first performance metric.

Another illustrative method comprises: detecting, by a differential health-check system, a change in performance of an information management system that operates at least in part under the control of a storage manager, wherein the detecting is based on: identifying, by the differential health-check system, a first time period wherein a first component in the information management system operated, at least in part, under the control of the storage manager, identifying, by the differential health-check system, a second time period that follows the first time period, wherein the first component operated, at least in part, under the control of the storage manager, comparing, by the differential health-check system, a first value of a first performance metric for the first component operating in the first time period to a second value of the first performance metric for the first component operating in the second time period, wherein the first value and the second value are based on information provided by the storage manager; and generating, by the differential health-check system, an indication to a user of whether the change in performance was detected based on the comparing of the second value of the first performance metric to the first value of the first performance metric; and wherein the first time period occurs before at least part of the information management system undergoes an upgrade, and wherein the second time period occurs after the upgrade is completed.

Other embodiments are directed at post-disaster recovery and data restoration in addition to or instead of upgrade scenarios. An illustrative method according to an exemplary embodiment comprises: identifying, by a differential health-check module, a first time period wherein a first component in an information management system operated, at least in part, under the control of a storage manager; identifying, by the differential health-check module, a second time period that follows the first time period, wherein the first component operated, at least in part, under the control of the storage manager; evaluating, by the differential health-check module, a first value of a first performance metric for the first component operating in the first time period, wherein the first value is based on information provided by the storage manager; evaluating, by the differential health-check module, a second value of the first performance metric for the first component operating in the second time period, wherein the second value is based on information provided by the storage manager; generating, by the differential health-check module, an indication to a user of a comparison of the second value of the first performance metric to the first value of the first performance metric; and wherein the first time period occurs before at least part of the information management system undergoes a restore operation, and the second time period occurs after the restore operation is completed. The restore operation may be based on a previously-completed disaster recovery operation performed in the information management system under the control of the storage manager. The restored component(s) may be any component in the information management system, for example the storage manager. The restore operation may be based on one or more index components and/or the management database in the information management system. The restore operation may comprise restoring one or more: a component of a primary storage subsystem in the information management system; and/or a component of a primary storage subsystem in the information management system, and further wherein the component is restored from a first host computing device to a different second host computing device; and/or a component of a secondary storage subsystem in the information management system; and/or a component of a secondary storage subsystem in the information management system from a non-operational state to an operational state, and further wherein the component is restored from a first host computing device to a different second host computing device; and/or restoring at least part of the storage manager; and/or restoring at least part of the storage manager in the information management system, and further wherein the storage manager is restored from a first host computing device to a different second host computing device.

In some embodiments, the first component is a secondary storage device. In some embodiments, the information provided by the storage manager is obtained from data stored in the storage manager. The differential health-check module may be a computing device, and furthermore the computing device may comprise circuitry for performing computer operations. The method may further comprise one or more of: requesting, by the differential health-check module before the restore operation is completed, information about the information management system; and/or receiving, by the differential health-check module before the restore operation is completed, information about the information management system from the storage manager; and/or receiving before the restore operation is completed, by a server that is remote from the differential health-check module, information about the information management system. Also, the information management system may be a data backup system.

Another illustrative method comprises: receiving, by a storage manager from a differential health-check module, one or more queries for information about a first component of an information management system that operates at least in part under the control of the storage manager, wherein the queried information is in reference to operations of the first component during at least one of a first time period and a second time period; extracting, by the storage manager in response to the one or more queries, information from the first component; generating by the storage manager, based at least in part on the extracted information, one or more responses that are responsive to the one or more received queries; transmitting the one or more responses to the differential health-check module; and wherein the first time period occurs before at least part of the information management system undergoes a restore operation, and the second time period occurs after the restore operation is completed.

Another illustrative method comprises: pre-processing, by a storage manager, in anticipation of a query from a differential health-check module, some information extracted by the storage manager from a first component of an information management system, wherein the first component operates at least in part under the control of the storage manager; receiving, by the storage manager from the differential health-check module, one or more queries for information about the first component, wherein the queried information is in reference to operations of the first component during at least one of a first time period and a second time period; generating by the storage manager, based at least in part on the pre-processed information, one or more responses to the one or more received queries; transmitting the one or more responses to the differential health-check module; and wherein the first time period occurs before at least part of the information management system undergoes a restore operation, and the second time period occurs after the restore operation is completed.

An illustrative differential health-check system comprises a differential health-check module that is configured to: communicate electronically with a storage manager that manages an information management system; receive a request for a differential health-check report having a report timeframe; define a first time period and a second time period based on the report timeframe, wherein the first time period occurs before at least part of the information management system undergoes a restore operation, and wherein the second time period occurs after the restore operation is completed; generate one or more queries for the storage manager, the queries comprising requests for information about a first component of the information management system operating during the first time period and during the second time period; evaluate a first value of a first performance metric for the first component operating in the first time period, based on information received from the storage manager in response to the one or more queries; evaluate a second value of the first performance metric for the first component operating in the second time period, based on information provided by the storage manager in response to the one or more queries; and generate an indication to the user of a change in performance of the first component in the second time period, based at least in part on comparing the second value of the first performance metric to the first value of the first performance metric; and wherein the restore operation is based on a previously-completed disaster recovery operation performed in the information management system under the control of the storage manager.

Another illustrative system comprises: a storage manager, wherein an information management system operates under the control of the storage manager; a differential health-check component that is configured to define, based on a request for a differential health-check report having a report timeframe, a first time period that occurs before at least part of the information management system undergoes a restore operation, and wherein a second time period occurs after the restore operation is completed; wherein the differential health-check component is further configured to receive, from the storage manager, information about a first component of the information management system operating during the first time period and during the second time period; wherein the differential health-check component is further configured to evaluate, based on the information received from the storage manager, (i) a first value of a first performance metric for the first component operating in the first time period, and (ii) a second value of the first performance metric for the first component operating in the second time period; and wherein the differential health-check component is further configured to generate the differential health-check report, based at least in part on comparing, by the differential health-check component, the second value of the first performance metric to the first value of the first performance metric.

A further illustrative method comprises: detecting, by a differential health-check system, a change in performance of an information management system that operates at least in part under the control of a storage manager, wherein the detecting is based on: identifying, by the differential health-check system, a first time period wherein a first component in the information management system operated, at least in part, under the control of the storage manager, identifying, by the differential health-check system, a second time period that follows the first time period, wherein the first component operated, at least in part, under the control of the storage manager, comparing, by the differential health-check system, a first value of a first performance metric for the first component operating in the first time period to a second value of the first performance metric for the first component operating in the second time period, wherein the first value and the second value are based on information provided by the storage manager; generating, by the differential health-check system, an indication to a user of the detected change in performance based on the comparing of the second value of the first performance metric to the first value of the first performance metric; and wherein the first time period occurs before at least part of the information management system undergoes a restore operation, and wherein the second time period occurs after the restore operation is completed, and further wherein the restore operation is based on a previously-completed disaster recovery operation performed in the information management system under the control of the storage manager.

The exemplary methods and systems may further comprise one or more other aspects as described above and elsewhere herein.

BRIEF DESCRIPTION OF THE DRAWINGS

FIGS. 1F-1H are block diagrams illustrating suitable data structures that may be employed by the information management system 100.

DETAILED DESCRIPTION

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 1A:
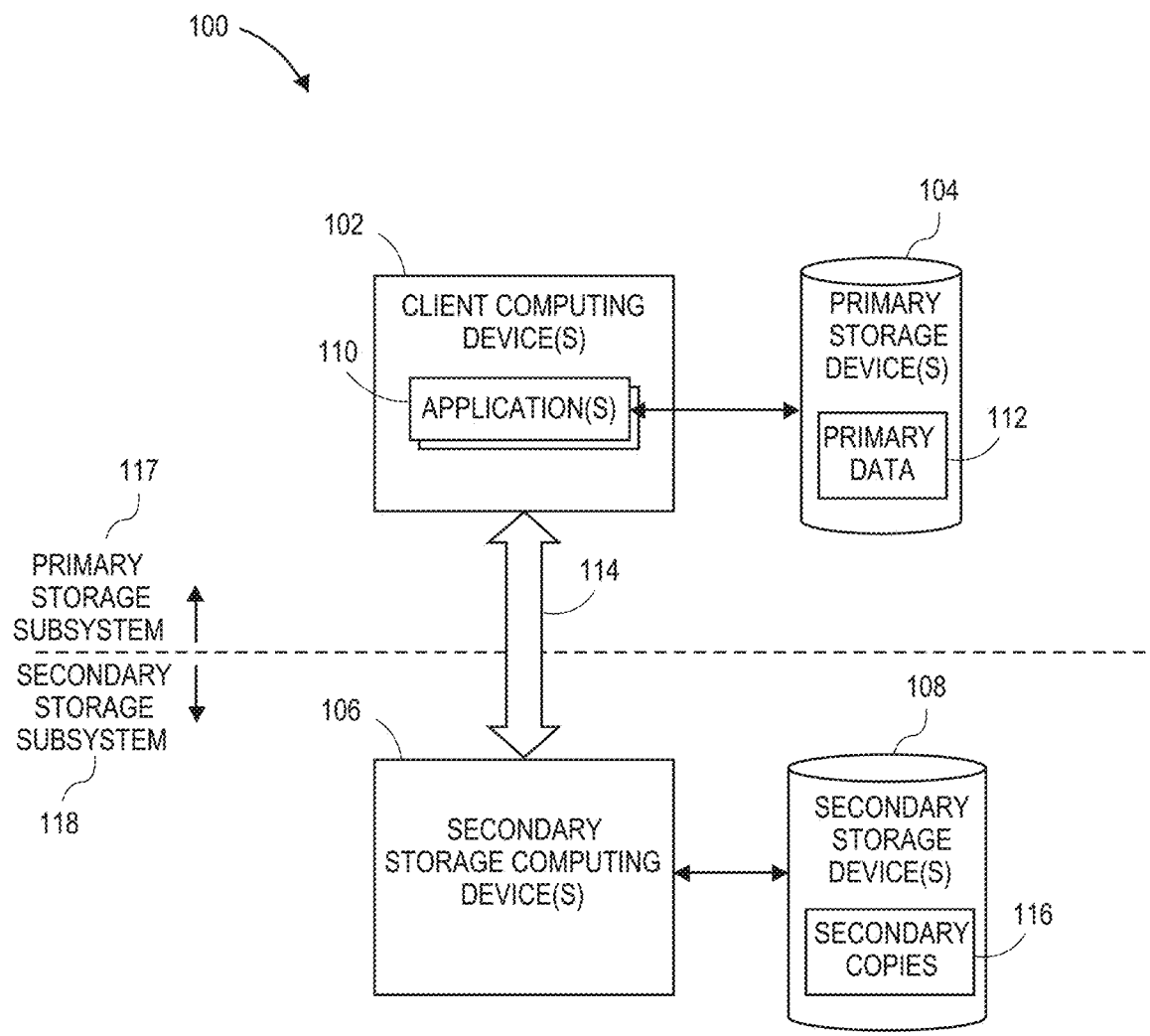
FIG. 1A is a block diagram illustrating an exemplary information management system 100.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 8,285,681, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 8,307,177, entitled "SYSTEMS AND METHODS FOR MANAGEMENT OF VIRTUALIZATION DATA";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 7,315,923, entitled "SYSTEM AND METHOD FOR COMBINING DATA STREAMS IN PIPELINED STORAGE OPERATIONS IN A STORAGE NETWORK";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2010/0299490, entitled "BLOCK-LEVEL SINGLE INSTANCING";

U.S. Pat. Pub. No. 2009/0319534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA";

U.S. Pat. No. 7,107,298, entitled "SYSTEM AND METHOD FOR ARCHIVING OBJECTS IN AN INFORMATION STORE";

U.S. Pat. No. 8,230,195, entitled "SYSTEM AND METHOD FOR PERFORMING AUXILIARY STORAGE OPERATIONS";

U.S. Pat. No. 8,229,954, entitled "MANAGING COPIES OF DATA"; and

U.S. Pat. No. 8,156,086, entitled "SYSTEMS AND METHODS FOR STORED DATA VERIFICATION".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers.

Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical virtual machine host operated by the organization. As one example, the organization may use one virtual machine as a database server and another virtual or physical machine as a mail server. A virtual machine manager (VMM) (e.g., a Hypervisor) may manage the virtual machines, and reside and execute on the virtual machine host. Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system residing on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

Figure 1B:
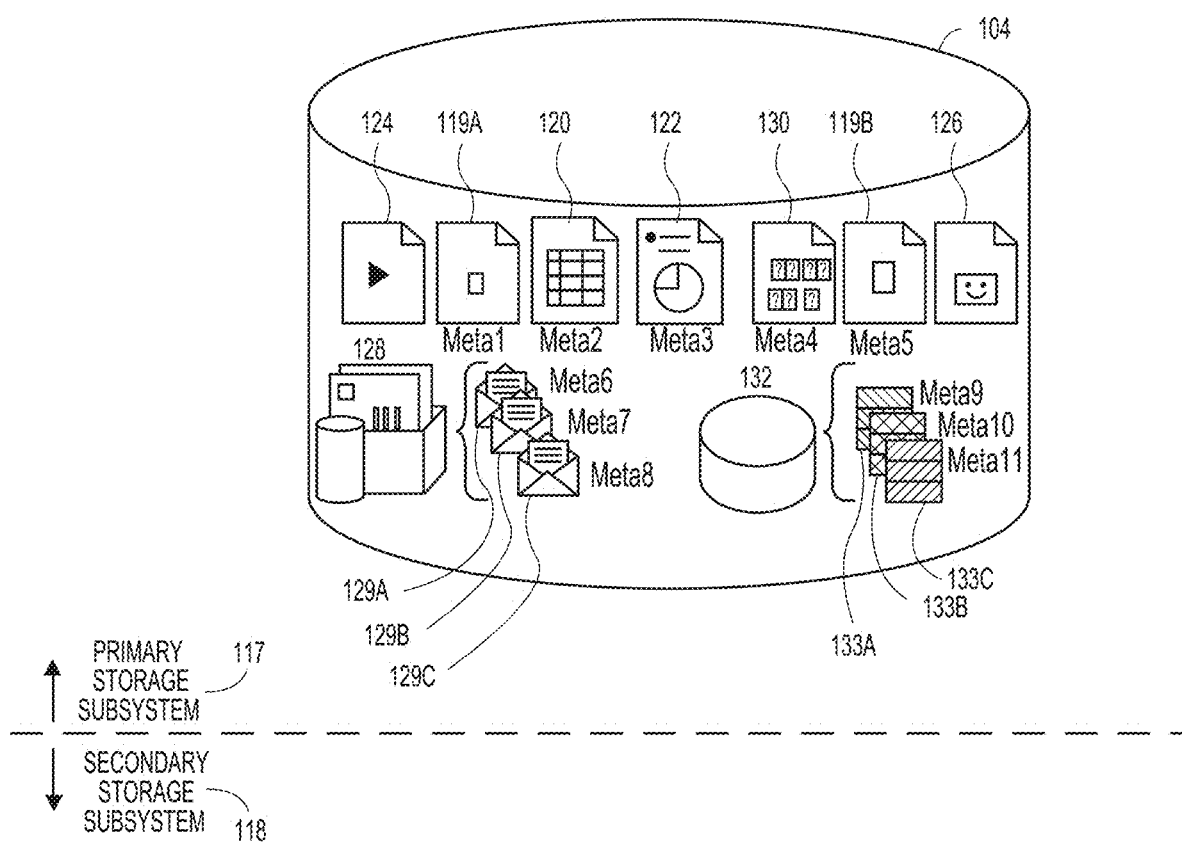
FIG. 1B is a detailed view of a primary storage device, a secondary storage device, and some examples of primary data and secondary copy data.
Figure 1B:
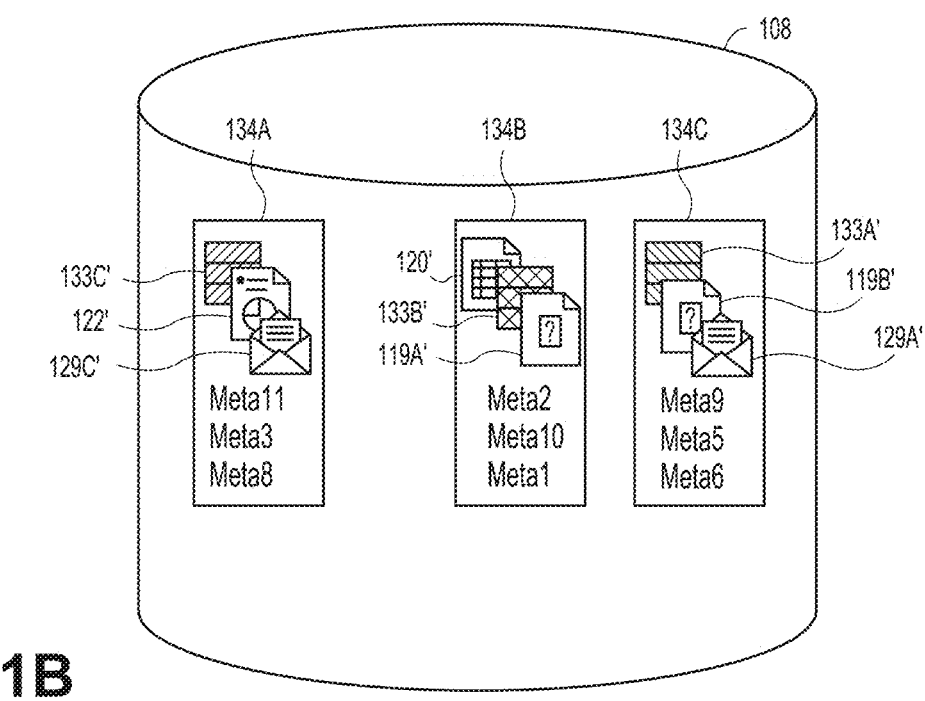

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

FIG. 16 is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122 and 129C (represented as 133C', 122' and 129C', respectively, and accompanied by the corresponding metadata Meta11, Meta3, and Meta8, respectively). Moreover, as indicated by the prime mark ('), a secondary copy object may store a representation of a primary data object or metadata differently than the original format, e.g., in a compressed, encrypted, deduplicated, or other modified format. Likewise, secondary data object 134b represents primary data objects 120, 133b, and 119A as 120', 133b', and 119A', respectively and accompanied by corresponding metadata Meta2, Meta10, and Meta1, respectively. Also, secondary data object 134C represents primary data objects 133A, 119b, and 129A as 133A', 119b', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
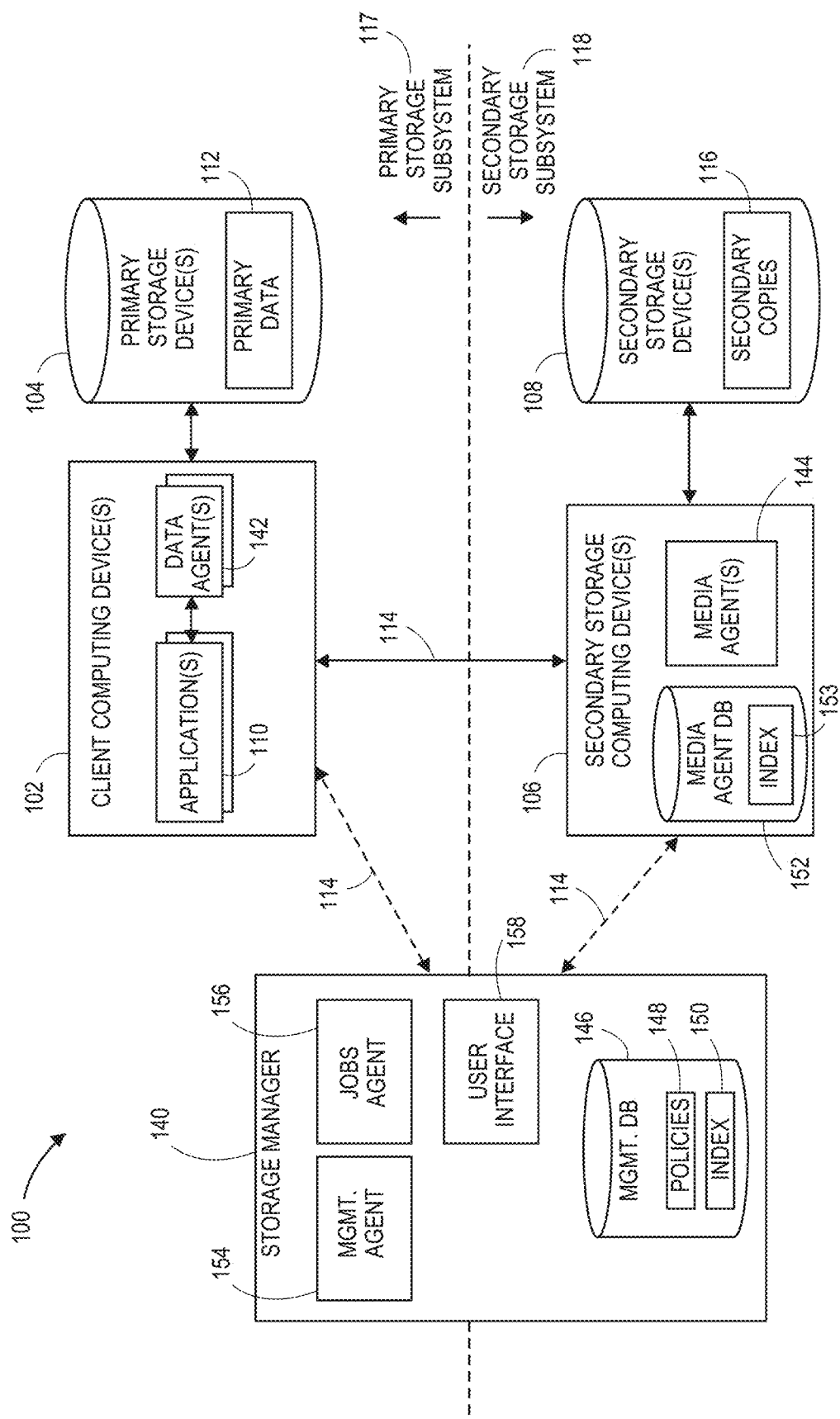
FIG. 1C is a block diagram of the exemplary information management system 100 including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application. In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata.

As shown by the dashed arrowed lines 114, the storage manager 140 may communicate with and/or control some or all elements of the information management system 100, such as the data agents 142 and media agents 144. Thus, in certain embodiments, control information originates from the storage manager 140, whereas payload data and payload metadata is generally communicated between the data agents 142 and the media agents 144 (or otherwise between the client computing device(s) 102 and the secondary storage computing device(s) 106), e.g., at the direction of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
- initiating execution of secondary copy operations;
- managing secondary storage devices 108 and inventory/capacity of the same;
- reporting, searching, and/or classification of data in the information management system 100;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An information management "cell" may generally include a logical and/or physical grouping of a combination of hardware and software components associated with performing information management operations on electronic data. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. Nos. 7,747,579 and 7,343,453, which are incorporated by reference herein.

Data Agents

As discussed, a variety of different types of applications 110 can reside on a given client computing device 102, including operating systems, database applications, e mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, Share Point data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

Where the information management system 100 includes multiple media agents 144 (FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the database 146 is relatively large, the database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
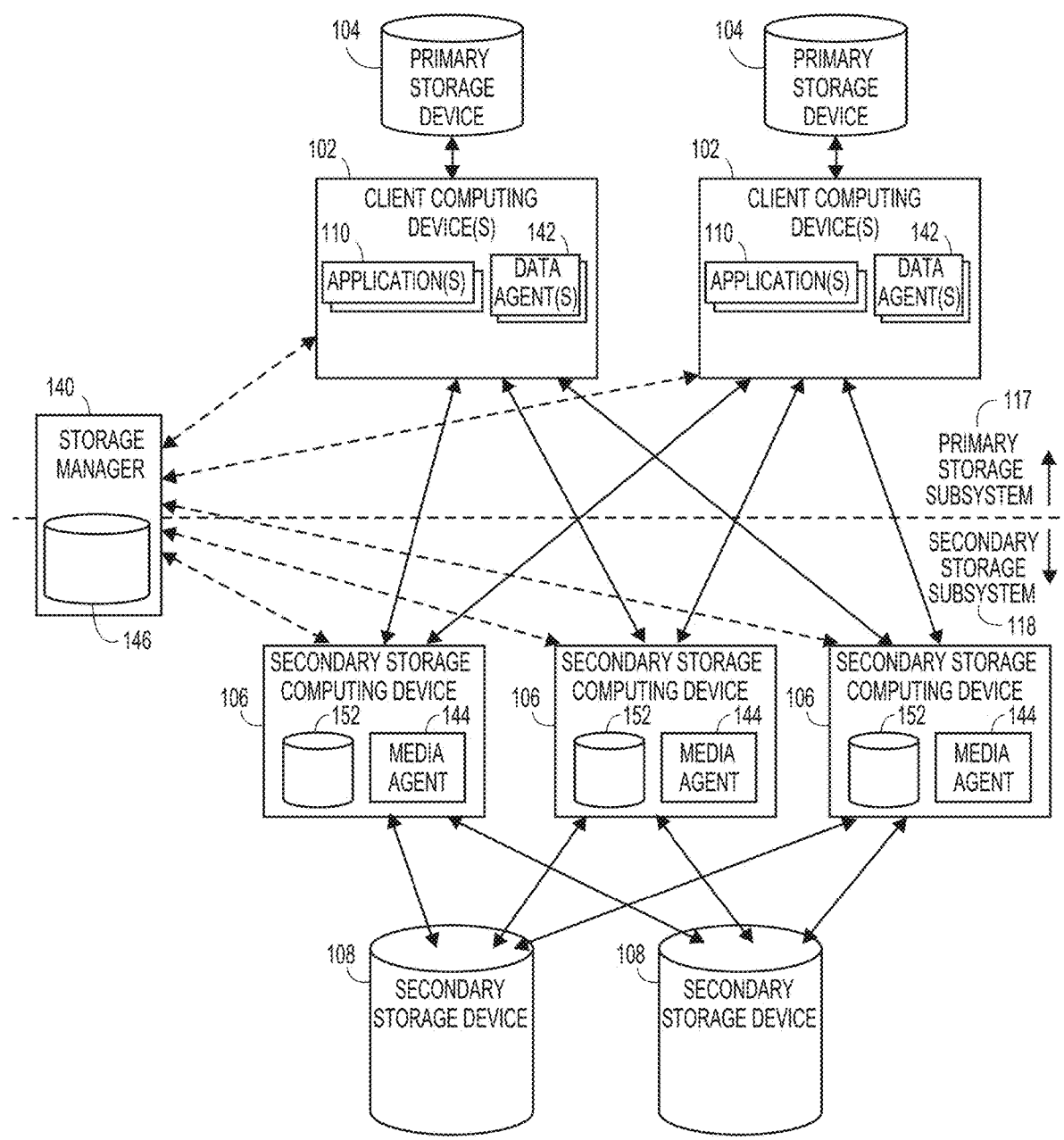
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files at the file-level, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware" snapshot operation can be a snapshot operation where a target storage device (e.g., a primary storage device 104 or a secondary storage device 108) performs the snapshot operation in a self-contained fashion, substantially independently, using hardware, firmware and/or software residing on the storage device itself. For instance, the storage device may be capable of performing snapshot operations upon request, generally without intervention or oversight from any of the other components in the information management system 100. In this manner, using hardware snapshots can off-load processing involved in snapshot creation and management from other components in the system 100.

A "software" snapshot operation, on the other hand, can be a snapshot operation in which one or more other components in the system (e.g., the client computing devices 102, data agents 142, etc.) implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. In some other cases, the snapshot may be created at the block level, such as where creation of the snapshot occurs without awareness of the file system. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

In order to streamline the comparison process, the information management system 100 may calculate and/or store signatures (e.g., hashes) corresponding to the individual data blocks in a database and compare the signatures (e.g., hashes) instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 (or other source storage device, such as a secondary storage device 108) to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the data stored within the primary data 112 and/or secondary copies 116, providing enhanced search and management capabilities for data discovery and other purposes. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

In order to further leverage the data stored in the information management system 100 to perform these and other tasks, one or more components can be configured to scan data and/or associated metadata for classification purposes to populate a database (or other data structure) of information (which can be referred to as a "data classification database" or a "metabase"). Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components. For instance, there may be a dedicated metabase associated with some or all of the client computing devices 102 and/or media agents 144. In some embodiments, a data classification database may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects.

Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

As an example, a storage manager 140 or other component in the information management system 100 may analyze traffic patterns and suggest or automatically route data via a particular route to e.g., certain facilitate storage and minimize congestion. In some embodiments, the system can generate predictions relating to storage operations or storage operation information. Such predictions described may be based on a trending analysis that may be used to predict various network operations or use of network resources such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of a set of associated storage operation cells in a hierarchy of information management cells, such as the status of jobs, system components, system resources, and other items, by communicating with storage managers 140 (or other components) in the respective storage operation cells. Moreover, the master storage manager 140 may track the status of its associated storage operation cells and associated information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component in the system may also determine whether a storage-related criteria or other criteria is satisfied, and perform an action or trigger event (e.g., data migration) in response to the criteria being satisfied, such as where a storage threshold is met for a particular volume, or where inadequate protection exists for certain data. For instance, in some embodiments, the system uses data from one or more storage operation cells to advise users of risks or indicates actions that can be used to mitigate or otherwise minimize these risks, and in some embodiments, dynamically takes action to mitigate or minimize these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be able to be restored within a given time period, that data on a secondary volume may be mirrored or otherwise migrated to a specified number of other volumes, etc.). If a risk condition or other criteria is triggered, the system can notify the user of these conditions and may suggest (or automatically implement) an action to mitigate or otherwise address the condition or minimize risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies a particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" and comparing it to certain operational thresholds to determine if the operation is being performed within a specified data protection service level. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about network elements to generate indications of costs associated with storage of particular data in the system or the availability of particular data in the system. In general, components in the system are identified and associated information is obtained (dynamically or manually). Characteristics or metrics associated with the network elements may be identified and associated with that component element for further use generating an indication of storage cost or data availability. Exemplary information generated could include how fast a particular department is using up available storage space, how long data would take to recover over a particular network pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides. Storage devices may be assigned to a particular cost category which is indicative of the cost of storing information on that device. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console. The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy. Such reports may be specified and created at a certain point in time as a network analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;

the type of copy 116 (e.g., type of secondary copy) and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation between different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
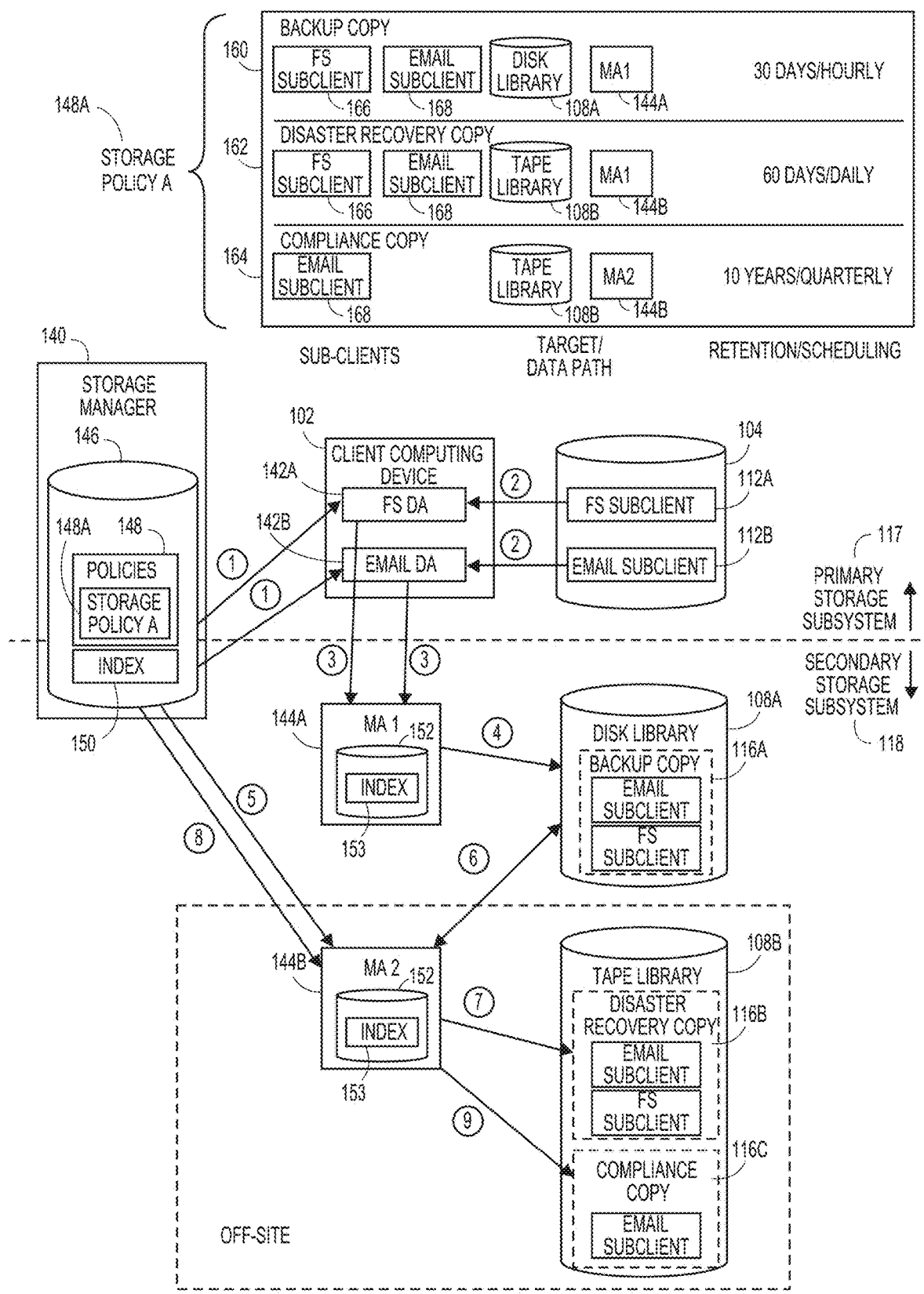
FIG. 1E illustrates certain secondary copy operations according to an exemplary storage policy.

FIG. 1E shows a data flow data diagram depicting performance of storage operations by an embodiment of an information management system 100, according to an exemplary storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a logical grouping of data associated with a file system) and a logical grouping of data associated with email data, respectively. Although for simplicity the logical grouping of data associated with the file system is referred to as a file system sub-client, and the logical grouping of data associated with the email data is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences or rule set 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and U.S. Pat. Pub. No. 2010/0299490, each of which is incorporated by reference herein.

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
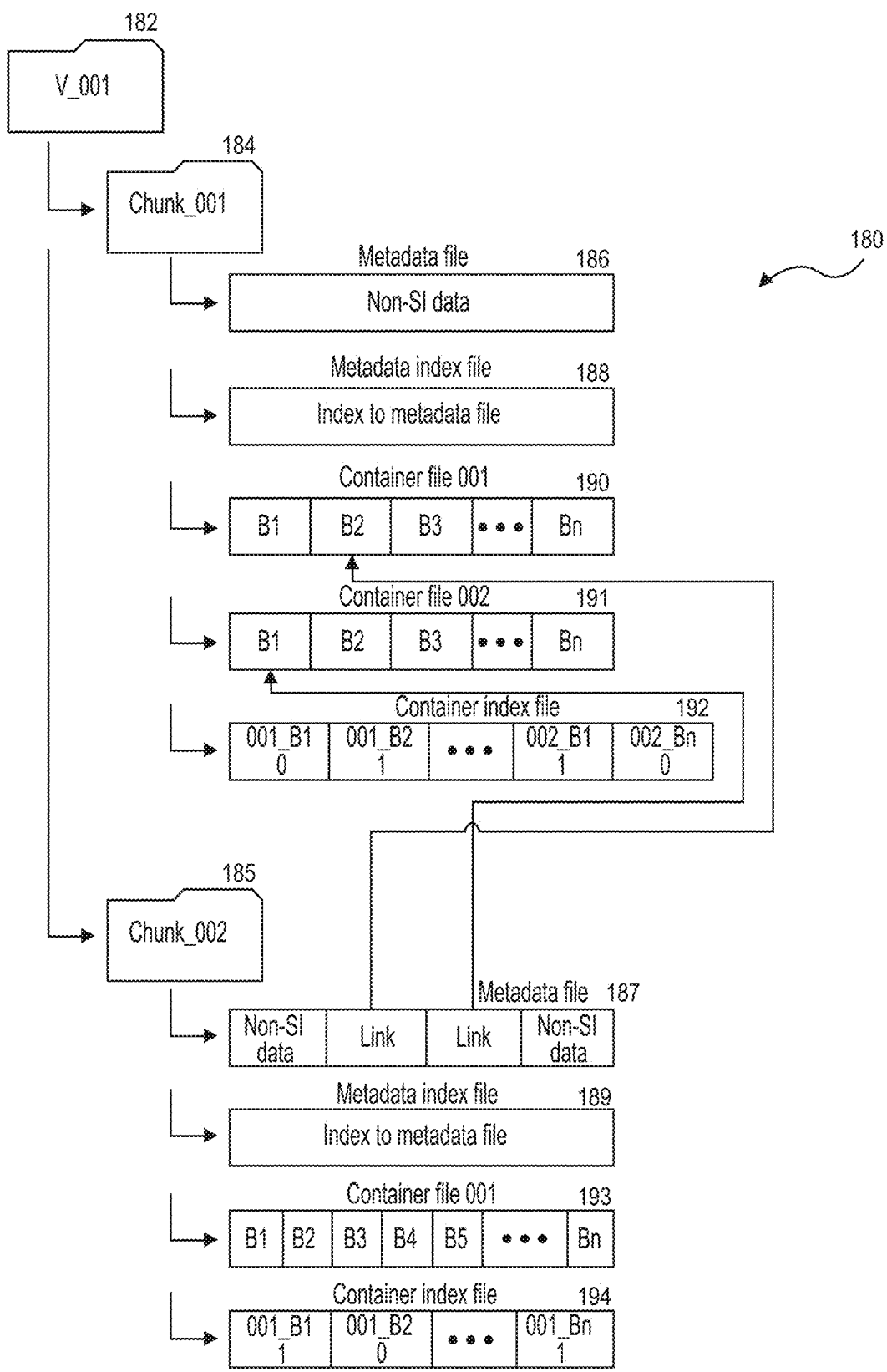

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 resides supports sparse files, then when the media agent 144 creates container files 190/191/193, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may be comprised in 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

Exemplary Differential Health-Check System

Figure 2:
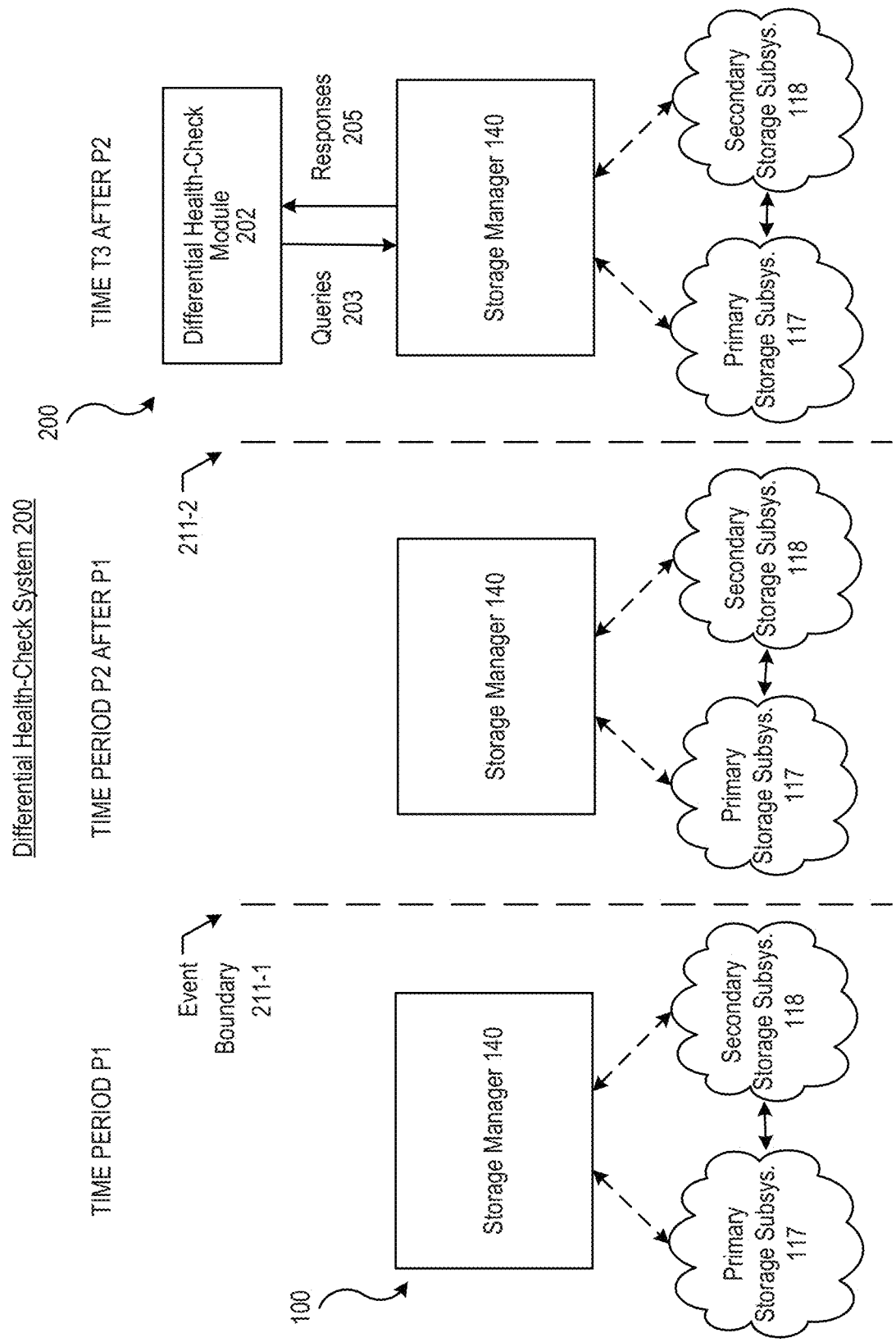
FIG. 2 depicts a diagram of an exemplary differential health-check system 200.

FIG. 2 depicts a diagram of an exemplary differential health-check system 200, according to an embodiment of the present invention. FIG. 2 depicts information management system 100 operating during a first time period P1, then operating during a second time period P2 that occurs after period P1. In the depiction of FIG. 2, system 200 operates at a time T3 after time period P2 (though it should be noted that system 200 also may operate during time periods P1 and/or P2 without limitation). Some elements of information management system 100 were described in greater detail in the preceding figures and others shall be described in further detail below.

Differential health-check system 200, according to the present exemplary embodiment comprises: differential health-check module 202 and information management system 100, which comprises storage manager 140, primary storage subsystem 117, and secondary storage subsystem 118 interconnected as shown. In some embodiments, system 100 is interconnected with, but not a part of, system 200. Information management system 100 may be configured differently during period P1 than during period P2. In some embodiments, there is no difference in the configuration of system 100 as between time period P1 versus period P2.

Event boundary 211-1 represents a delineation in time between time period P1 and time period P2, and is typically defined by a triggering event. A triggering event may be an upgrade, or a disaster from which system 100 must recover via one or more restore operations, or changing a configuration of system 100 or any subsystem/element thereof; or an arbitrary point in time, e.g., the first of the month; or any other delineation between an earlier time period P1 and a later time period P2. An upgrade may comprise software, firmware, and/or hardware updates to system 100 or any subsystem/element thereof; an installation of a service pack to system 100 or any subsystem/element thereof; a replacement of equipment in any element(s) of system 100; an addition and/or removal of equipment in any element(s) of system 100; an installation/activation of a virtualized computing environment in any element(s) of system 100; etc. Any number of triggering event(s) may be envisioned within the scope of the present invention.

Event boundary 211-2 represents a delineation in time between the end of period P2 and a later point in time, T3. T3 is defined, according to the illustrative embodiment, as the time when differential health-check system 200 is invoked to execute a differential-health check of information management system 100 relative to time period P1 versus time period P2. Time period P1 may be defined as having any duration, without limitation. Time period P2 may be defined as having any duration, without limitation. The delay between time periods P1 and P2 may be of any duration; likewise, the delay between time period P2 and time T3 may be any duration.

The computing device(s) that host differential health-check module 202 and the computing device that hosts storage manager 140 are each configured to communicate electronically via at least queries 203 and responses 205 according to the illustrative embodiment; they may be in direct electronic communications, e.g., via dedicated lines, or may be connected via public and/or private telecommunications network(s) such as the Internet. Differential health-check module 202 may itself be a computing device that comprises circuitry for executing computer instructions. Likewise, the storage manager 140.

It will be clear to those having ordinary skill in the art, after reading the present disclosure, how to make and use alternative embodiments wherein differential health-check system 200 may be differently configured and arranged. For example, a single computing device or a unified virtual computing environment may host storage manager 140 as well as differential health-check module 202 such that the queries 203 and responses 205 operate between modules within the same computing device/environment. For example, differential health-check module 202 may operate in a "cloud" computing environment that communicates and connects with storage manager 140 via public and/or private telecommunications network(s) such as the Internet; likewise, (the host of) module 202 may be located anywhere worldwide, apart from (the host of) storage manager 140, for example in a centralized configuration that communicates with a plurality of information management systems 100 and their constituent storage manager(s) 104.

Exemplary uses of differential health-check system 200 include, without limitation, evaluating the performance of an information management system 100 after a triggering event that occurs at or about an event boundary 211-1. Exemplary triggering events include, without limitation, an upgrade to any element of the system, such as an upgrade to storage manager 140, or a hardware upgrade to the device hosting storage manager 140, or a disaster recovery operation for one or more elements of system 100, or an installation of new components in system 100 (e.g., client computing devices 102, secondary storage computing devices 106, secondary storage devices 108, etc.), etc. Illustratively, the exemplary analysis and reporting disclosed herein may provide the administrator of system 100 with useful information about the outcome of the triggering event. Advantageously, the disclosed analysis and reporting performed by system 200 may point to problems that were resolved by the triggering event such as an upgrade (e.g., increased throughput, better job success rate, improved disk usage, etc.), and/or may detect problems that were introduced by the upgrade (e.g., resource constraints, software bugs, decreased throughput, uncompleted jobs, etc.). Likewise, restoring system 100 after a disaster triggering event may have introduced problems that may be detected and reported on by differential health-check system 200. Performance of information management system 100 may be monitored on a regular basis (e.g., monthly) to detect whether ongoing performance is degrading—even when no triggering event is known to have occurred.

Though not expressly depicted in the present figure, a remote server may operate apart (physically and/or logically apart) from differential health-check module 202 to request and/or receive information from storage manager 140 during one or more of the time periods illustrated herein.

Figure 3A:
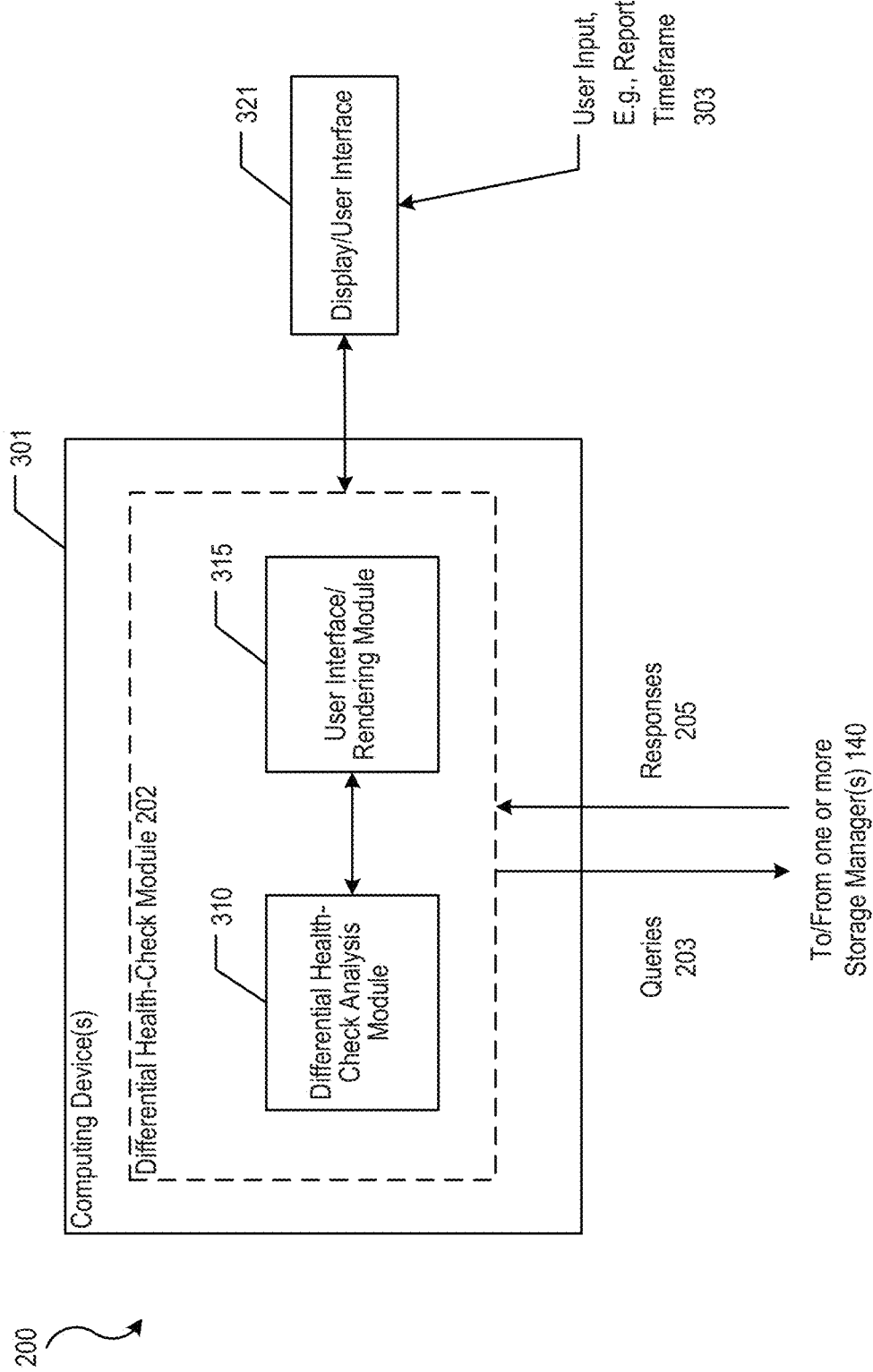
FIG. 3A depicts a detailed view of part of differential health-check system 200.

FIG. 3A depicts a detailed view of part of differential health-check system 200, according to the exemplary embodiment. Differential health-check system 200 comprises one or more computing devices 301 that host(s) differential health-check module 202; a display 321 having a user interface whereby a user may input a desired report timeframe 303; module 202 illustratively comprises a differential health-check analysis module 310 and a user interface/rendering module 315.

Computing device(s) 301 may be one or more computing devices as described earlier in the present disclosure. In some embodiments, computing devices 301 operate in a virtualized computing environment; or in a cloud computing configuration; or comprise a hardware platform that is specially configured to execute the differential health-check functions disclosed herein; etc., without limitation. As noted above, in some embodiments, differential health-check module 202 is itself a computing device, i.e., a unified platform 202/301 having circuitry to execute computer instructions as appropriate to perform the functions disclosed herein.

Display/user interface 321 may be any display unit that is known in the art and that is configured to present an interactive user interface to a user of exemplary system 200. For example, display/user interface 321 is capable of receiving user input that indicates a desired report timeframe 303 and is further capable of transmitting said user input to computing device 301. Display/user interface 321 is displays information that is presented to a user by module 202, such as the illustrative examples shown in FIGS. 8A and 8B.

Differential health-check analysis module 310 is, according to the present embodiment, software that executes on computing device(s) 301 and that, in conjunction with user interface/rendering module 315 performs the salient tasks of method 400 as described in further detail below.

User interface/rendering module 315 is, according to the present embodiment, software that executes on computing device(s) 301 and that performs the user interface interpretation and/or display rendering for the salient tasks of method 400 as described in further detail below. For example, module 315 may receive information from analysis module 310 and render the information into a visual format suitable for presentation to a user on display unit 321, e.g., as in FIGS. 8A and 8B herein.

As noted earlier, computing device 301 is also configured to perform electronic communications with other components, e.g., transmitting signals comprising queries 203 to storage manager 140 and receiving signals comprising responses 205 from storage manager 140, etc.

It will be clear to those having ordinary skill in the art, after reading the present disclosure, how to make and use alternative embodiments wherein the functionality of differential health-check system 200 is differently organized, grouped, sub-divided, and/or allocated to computing platforms. For example, modules 310 and 315 may be embodied by a single unified module. For example, modules 310 and 315 may execute on separate computing platforms or may be integrated with one or more other modules executing on computing device(s) 301 or on other computing devices, or may be differently organized or sub-divided. In some embodiments, modules 310 and/or 315 may be part of storage manager 140, e.g., the functionality of module 315 may be incorporated in user interface 158.

Figure 3B:
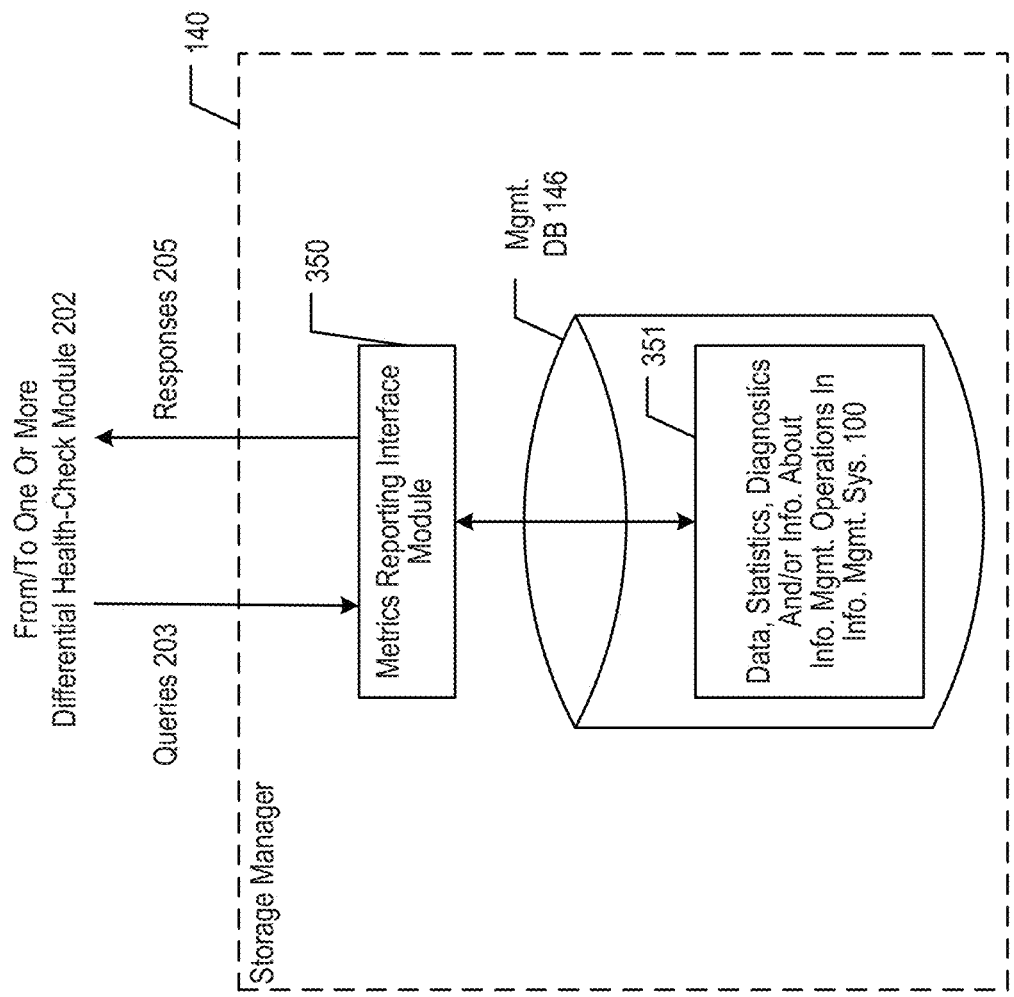
FIG. 3B depicts a detailed view of part of storage manager 140.

FIG. 3B depicts a detailed view of part of storage manager 140 in accordance with the exemplary embodiment. Storage manager 140 comprises metrics reporting interface module 350, and data structure(s) 351 within management database 146, and is further capable of receiving queries 203 and transmitting responses 205 from/to differential health-check computing device(s) 301.

Metrics reporting interface module 350 is, according to the exemplary embodiment, software that executes on the same host as storage manager 140, as a module within storage manager 140. Module 350 performs the salient tasks of method 700 as described in further detail below, for example, receiving and processing queries 203, extracting and processing data from data structure(s) 351, and generating responses 205. Module 350 is capable of communicating with management database 146 as well with other databases and indexes in information management system 100, such that it may extract the information necessary to properly respond to queries 203. For example, though not shown in the present figure, module 350 may extract information from one or more index 153 on secondary storage computing device 106, using communication pathways available in system 100. For example, though not shown in the present figure, module 350 may interrogate one or more media agents 144 for information necessary to properly respond to queries 203—using communication pathways available in system 100.

Data structure 351, according to the exemplary embodiment, resides within management database 146 and comprises a plurality of data, statistics, diagnostics, and/or other information pertaining to information management operations in information management system 100. For example, data structure 351 may comprise raw data about the execution of storage policies; and/or pre-processed statistics about the execution of storage policies during a particular timeframe; and/or diagnostics that arose in reference to said storage policies; etc., without limitation.

It will be clear to those having ordinary skill in the art, after reading the present disclosure, how to make and use alternative embodiments wherein the functionality of differential health-check system 200 is differently organized, grouped, sub-divided, and/or allocated to computing platforms. For example, module 350 may be integrated with other functional module(s) of storage manager 140. For example, module 350 may execute on a hardware platform other than storage manager 140. For example, data structure(s) 351 may be subdivided among a plurality of data structures within or without management database 146. For example, data structure(s) 351 may reside in whole or in part on computing or storage device(s) other than the one hosting management database 146 and/or apart from the host of storage manager 140.

Figure 4:
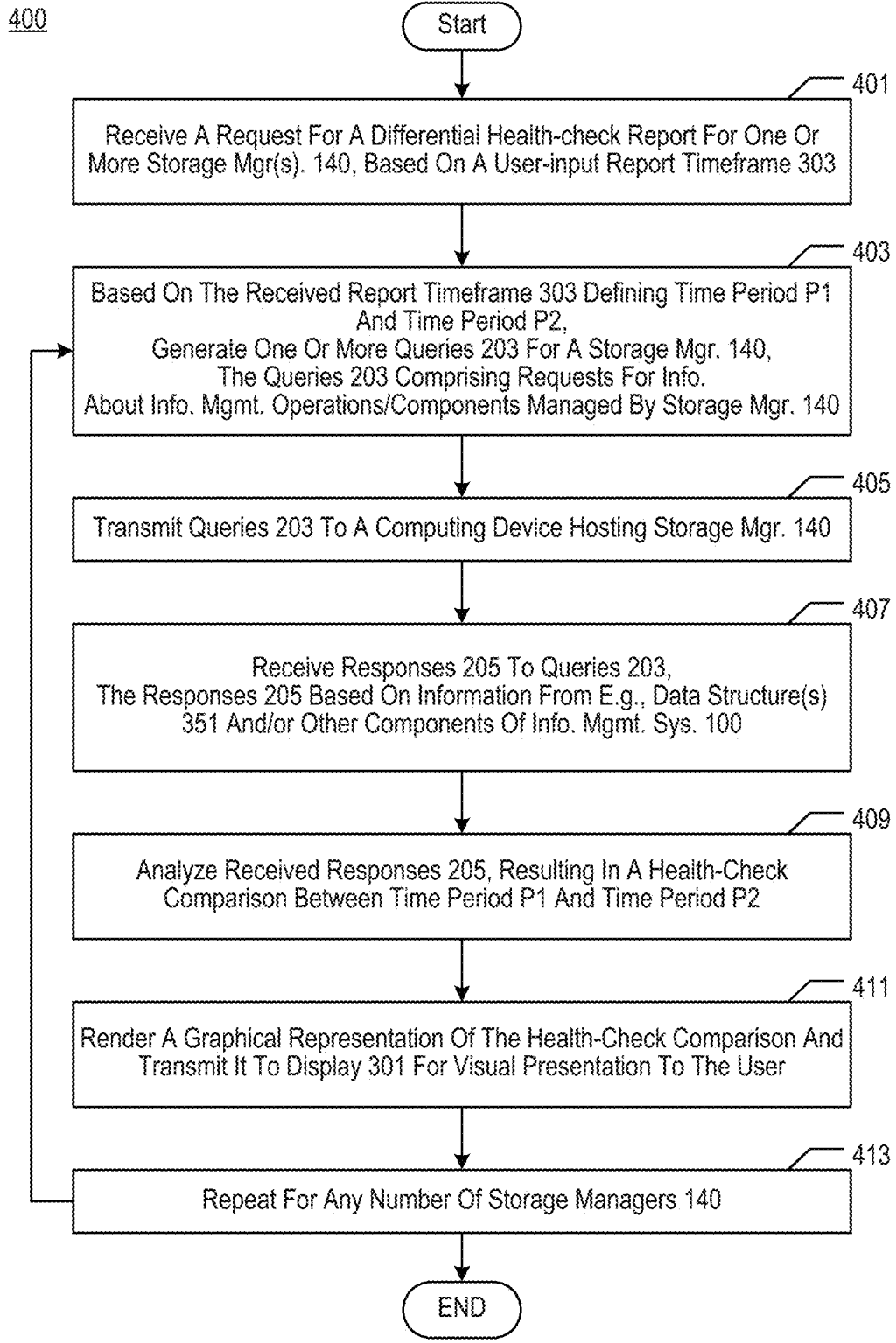
FIG. 4 depicts some salient operations of exemplary method 400.

FIG. 4 depicts some salient operations of method 400 according to the exemplary embodiment of the present invention. According to the exemplary system 200, differential health-check module 202 (including any constituent elements thereof) illustratively performs the salient tasks of method 400 as described in further detail below.

At block 401, module 310 receives a request for a differential health-check report for one or more storage managers 140. The request is based on report timeframe 303 that is input by a user. For example, the user having input timeframe 303 may request a report for the three days before and the three days after a system upgrade that occurred on a given date, e.g., FIGS. 8A and 8B for an illustrative graphical representation). Here, the user seeks to perform a health-check to detect performance improvements and/or deterioration and/or status quo relative to a triggering event, such as an upgrade or a post-disaster restore operation, or a periodic schedule, etc.

Figure 8A:
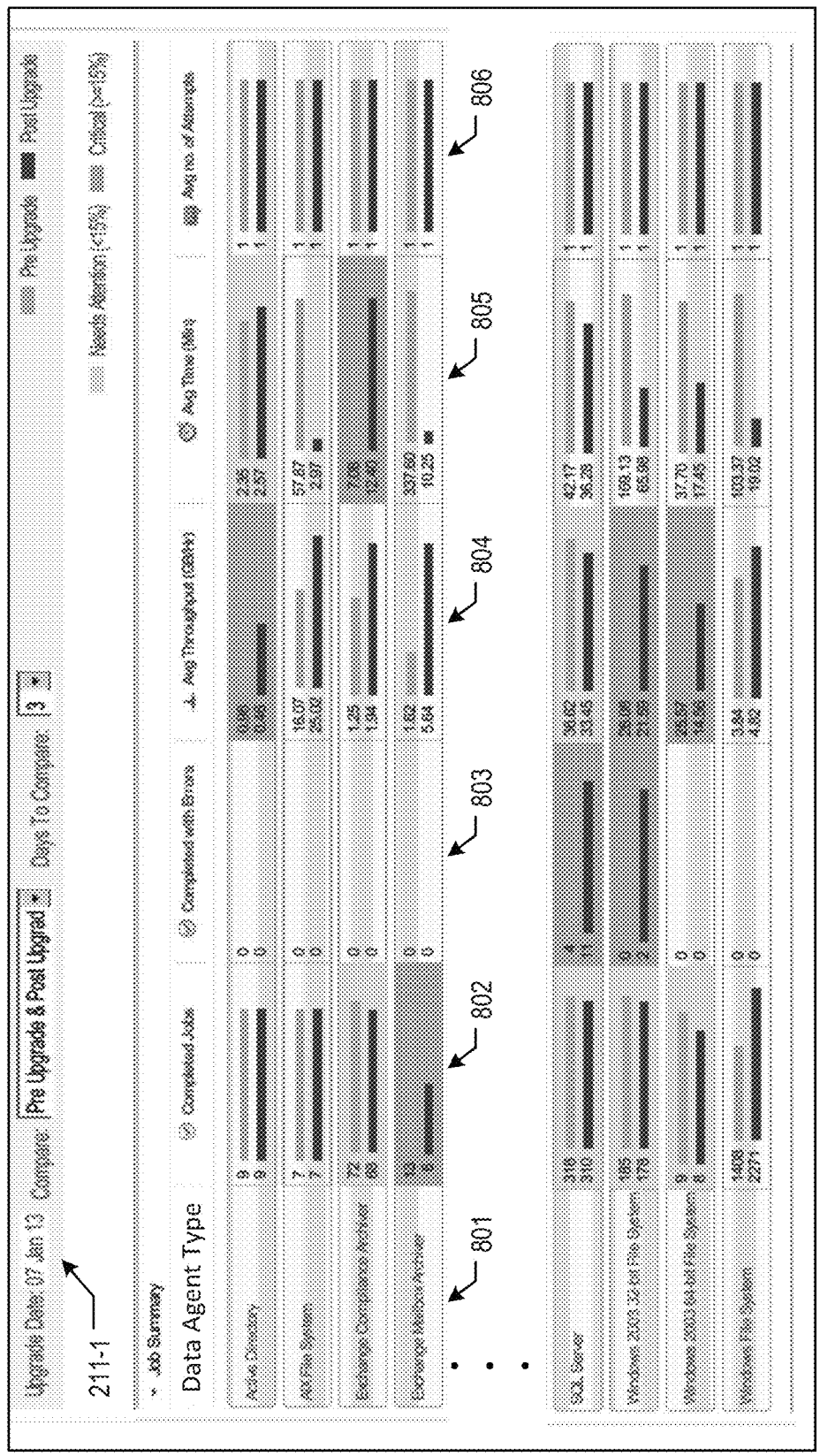
FIG. 8A depicts an exemplary visual presentation on display/user interface 321 that reports on jobs executed by data agents 142 in time periods P1 and P2.
Figure 8B:
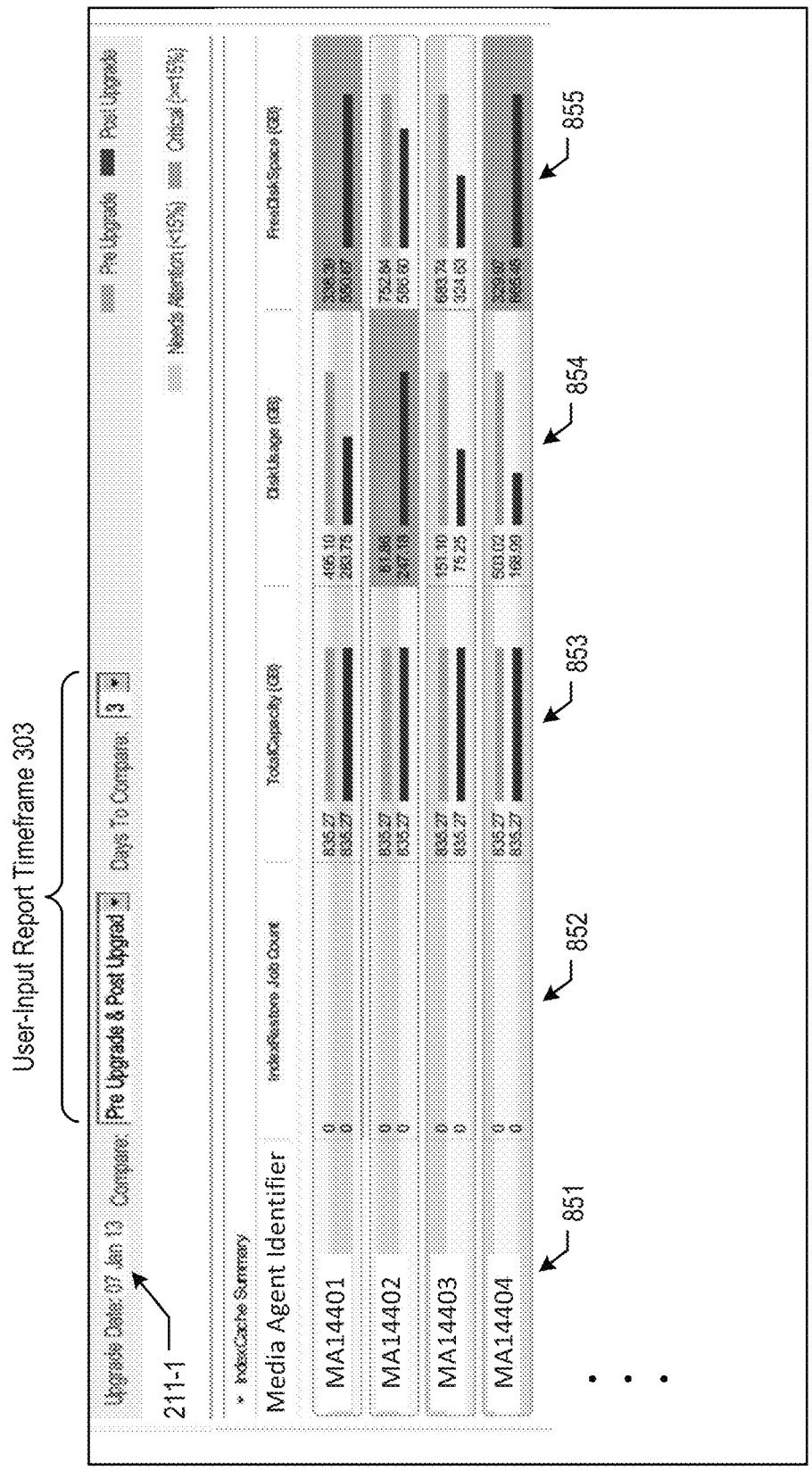
FIG. 8B depicts an exemplary visual presentation on display/user interface 321 that reports from indexes 153 that are associated with respective media agents 144 in time periods P1 and P2.

At block 403, module 310 defines time period P1 and time period P2 based on the received timeframe 303. Continuing with the above-mentioned example, time period P1 is defined as the three days before the system upgrade, and time period P2 is defined as the three days after the system upgrade. The date of the upgrade represents event boundary 211-1 as depicted in FIGS. 8A and 8B. Having defined the time periods P1 and P2, module 310 generates one or more queries 203 for a storage manager 140 that manages and controls information management system 100, which is the subject of the user's interest. The queries 203 comprise requests for information about information management operations in and/or components of information management system 100, typically managed by and under the control of the storage manager 140. According to the exemplary embodiment, queries 203 pertain to operations performed by data agents 142 as well as media agents 144 in system 100.

Examples of queried information may include, without limitation:

For the time period P1, the number of jobs completed by each data agent, including any errored jobs;

For the time period P1, throughput metrics, e.g., throughput per job or aggregate throughput for the time period, etc.;

For the time period P1, time metrics for the completed jobs, e.g., duration per job or aggregate for the time period, etc.;

For the time period P1, a count of the number of jobs attempted by each data agent;

For the time period P1, the job count for each media agent;

For the time period P1, the total data storage capacity available to each media agent;

For the time period P1, the total disk (or other media) usage accessed by the respective media agent;

For the time period P1, the free disk (or other media) space available to the media agent;

For the time period P2, the data corresponding to the above queries. Notably, the information to be queried is merely illustrative, and the person skilled in the art, after reading the present disclosure, may cause system 200 to implement other/additional queries for relevant information as deemed suitable for the differential health-check system being implemented. For example, metrics associated with system upgrades may differ from metrics associated with post-disaster restoration and reconstruction. For example, thresholds for the various metrics may also differ by metric or by type of operation or by type of entity being measured or according to other schemes that may be devised by the implements of system 200.

At block 405, module 310 sends queries 203 to storage manager 140, via electronic communications. The electronic communications may be transmitted from computing device 301 to the computing device that hosts storage manager 140, or from module 202 to storage manager 140, depending on the configuration and embodiment of system 100 and/or system 200. As noted above, the electronic communications may take the form of one or more electromagnetic signals that travel directly or indirectly from the transmitting entity to the receiving entity. For example, module 310 may transmit queries 203 requesting information about a particular media agent covering time period P1 and also time period P2.

At block 407, module 310 receives responses 205 to queries 203, again, via electronic communications. The electronic communications may be transmitted from the computing device that hosts storage manager 140 to computing device 301, or from storage manager 140 to module 202, depending on the configuration and embodiment of system 100 and/or system 200. As noted above, the electronic communications may take the form of one or more electromagnetic signals that travel directly or indirectly from the transmitting entity to the receiving entity. Continuing the example above, responses 205 may comprise information about the particular media agent, about the secondary storage devices it interacted with, and also about the back-up operations that it performed covering the time periods P1 and P2. Any number of details pertaining to the particular media agent may be included in responses 205, without limitation. Notably, the responses may be based on one or more sources of information, such as data structure(s) 351 and/or other data residing on and/or associated with storage manager 140, and may also be sources from other components in information management system 100 that are not storage manager 140, such as from the media agent, from an index associated with the media agent, or from other data structures on a secondary storage computing device, or even from data in secondary storage on a secondary storage device.

At block 409, module 310 analyzes the received responses 205. The extent and scope of the analysis depends on the details available from responses 205. For example, module 310 may reduce received data, e.g., computing aggregate throughput for a given data agent, or eliminating data outside of time periods P1 and P2, or filtering data according to certain conditions/parameters, etc. For example, module 310 may receive pre-processed or aggregated statistics available from storage manager 140. The analysis, as performed by module 310, produces a comparison of corresponding metrics as between time period P1 and time period P2. Block 409 is described in further detail below and in an accompanying figure.

At block 411, user interface/rendering module 315 processes the comparison resulting from the preceding block and renders it into a graphical representation suitable for visual presentation to a user via display/user interface 321. The rendering is transmitted to display 321. Illustrative examples may be found in FIGS. 8A and 8B herein.

At block 413, method 400 loops back to block 403 to repeat execution for any number of relevant storage managers 140. For example, in a hierarchical information management system 100 or in a multi-cell system, more than one storage manager 140 may be operational and managing one or more relevant components such as data agents and/or media agents, etc. Therefore, method 400 may capture data from any and all storage managers to provide reporting according to the exemplary embodiment.

It will be clear to those having ordinary skill in the art, after reading the present disclosure, how to make and use alternative embodiments wherein method 400 is differently organized, executed, sequenced, sub-divided into sub-operations, and/or distributed among different modules and/or components and/or different computing platforms. It will be further clear, after reading the present disclosure, that any number, variations, and arrangements of different reports may be generated and presented to the user of differential health-check system 200, as defined by the implementers of the system.

Figure 5:
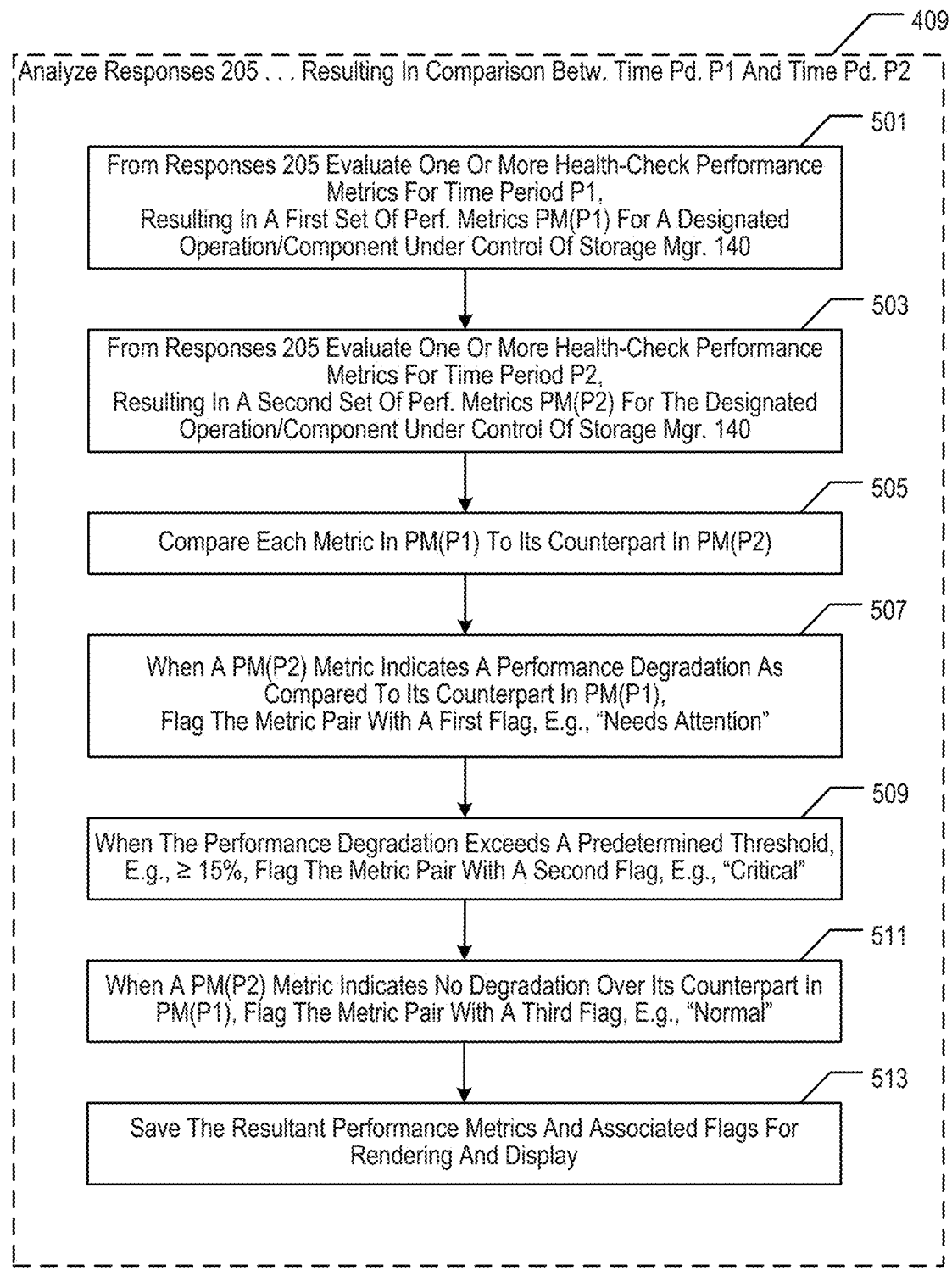
FIG. 5 depicts some salient operations of block 409.

FIG. 5 depicts some salient operations of block 409 in method 400, according to the exemplary embodiment.

At block 501, from responses 205, for each data agent 142 and for each media agent 144 associated with storage manager 140, one or more "health-check" performance metrics are evaluated for time period P1. The set of performance metrics evaluated as to time period P1 is designated PM(P1).

For data agents, examples of health-check performance metrics include, without limitation:
The number of completed jobs in the time period;
The number of jobs completed with errors in the time period;
The average data throughput of jobs in the time period, e.g., in GB/Hr.;
The average time of a job in the time period, e.g., in minutes;
The average number of job attempts per job completed in the time period.

For media agents, examples of health-check performance metrics include, without limitation:
The restore job count (in index 153) in the time period;
The total data storage capacity available to the media agent in the time period, e.g., in GB;
The total disk (or other media) storage capacity used in the time period, e.g., in GB;
The total disk (or other media) storage capacity available in the time period, e.g., in GB.

At block 503, from responses 205, for each data agent 142 and for each media agent 144 associated with storage manager 140, one or more "health-check" performance metrics are evaluated for time period P2. The set of performance metrics evaluated as to time period P2 is designated PM(P2). The metrics correspond to those for period P1. Additionally, system 200 may also generate and evaluate other health-check performance metrics in reference to the above-mentioned and other components of information management system 100 for time periods P1 and P2.

Although the above-described performance metrics are based on information provided by storage manager 140, in some embodiments, one or more of the performance metrics may also be based on other information, such as information obtained by differential health-check system 200 at an earlier time, and/or information from remote server(s) that previously collected information from information management system 100. In some embodiments, storage manager 140 provides information that is extracts from a component in real-time or near-real-time in response to a given query, e.g., polling a media agent after receiving a query 203 requesting information about the media agent. In some embodiments, storage manager 140 provides information that is has pre-extracted and/or pre-processed in anticipation of receiving queries 203.

At block 505, each metric in PM(P1) is compared to its counterpart in PM(P2). For example, for a given data agent (e.g., Active Directory), the number of completed jobs in period P1 is compared to the number of completed jobs in period P2; the average throughput of the data agent handling backup operations in period P1 is compared to the corresponding average throughput for period P2; etc. for any relevant performance metrics for the given data agent. For example, in regard to a media agent, the disk usage for period P1 is compared to the disk usage for period P2, and so on for other performance metrics that are relevant for media agents, without limitation.

At block 507, when a PM(P2) metric indicates that a performance degradation occurred as compared to time period P1, i.e., as to a corresponding metric in PM(P1), the P1/P2 metric pair is flagged with a first flag, e.g., "needs attention," or "deterioration detected," etc. For example, when average throughput drops as between period P1 and period P2, this is defined as a deterioration in performance and the first flag is applied. Thus, system 200 and module 202 can be said to have detected a change in the "health" or performance of information management system 100 relative to the triggering event. In some embodiments, a "margin" threshold may be applied to avoid detecting a deterioration or an improvement that is only marginal, e.g., within 2%.

At block 509, when the deterioration in performance exceeds a predetermined threshold, the metric pair is flagged with a second, more urgent flag, e.g., "critical," or "severe deterioration detected," etc. Depending on the implementation of system 200, there may be only one threshold for the second flag, e.g., a 15% deterioration for every metric from period P1 to period P2; or there may be metric-specific thresholds for the second flag, e.g., 15% for a throughput drop, and 10% for a time increase. Also, component-specific thresholds may be implemented, e.g., different thresholds for data agents from media agents.

At block 511, when a PM(P2) metric indicates no degradation over its counterpart in PM(P1), the metric pair is flagged with a third flag, e.g., "normal," or "no change," etc. In some embodiments, the third flag, or another flag, is used for a perceived performance improvement, such as when the metric in PM(P2) substantially exceeds its counterpart in PM(P1), e.g., a 10% improvement in throughput after a system upgrade, which is illustratively flagged as an improvement.

The threshold values, meanings, and designations of these and other flags in reference to the detected change (or no-change) in performance of any given metric from period P1 to period P2 shall be established by the implementers of system 200. For example, any change in performance of less than 3% may be designated "no change" or "normal."

At block 513, the resultant performance metrics in PM(P1) and PM(P2) and the associated flags are saved for rendering and display. The location and format of the saved results will be implementation-specific. Control passes out of block 409 to the next operation in method 400.

Figure 6:
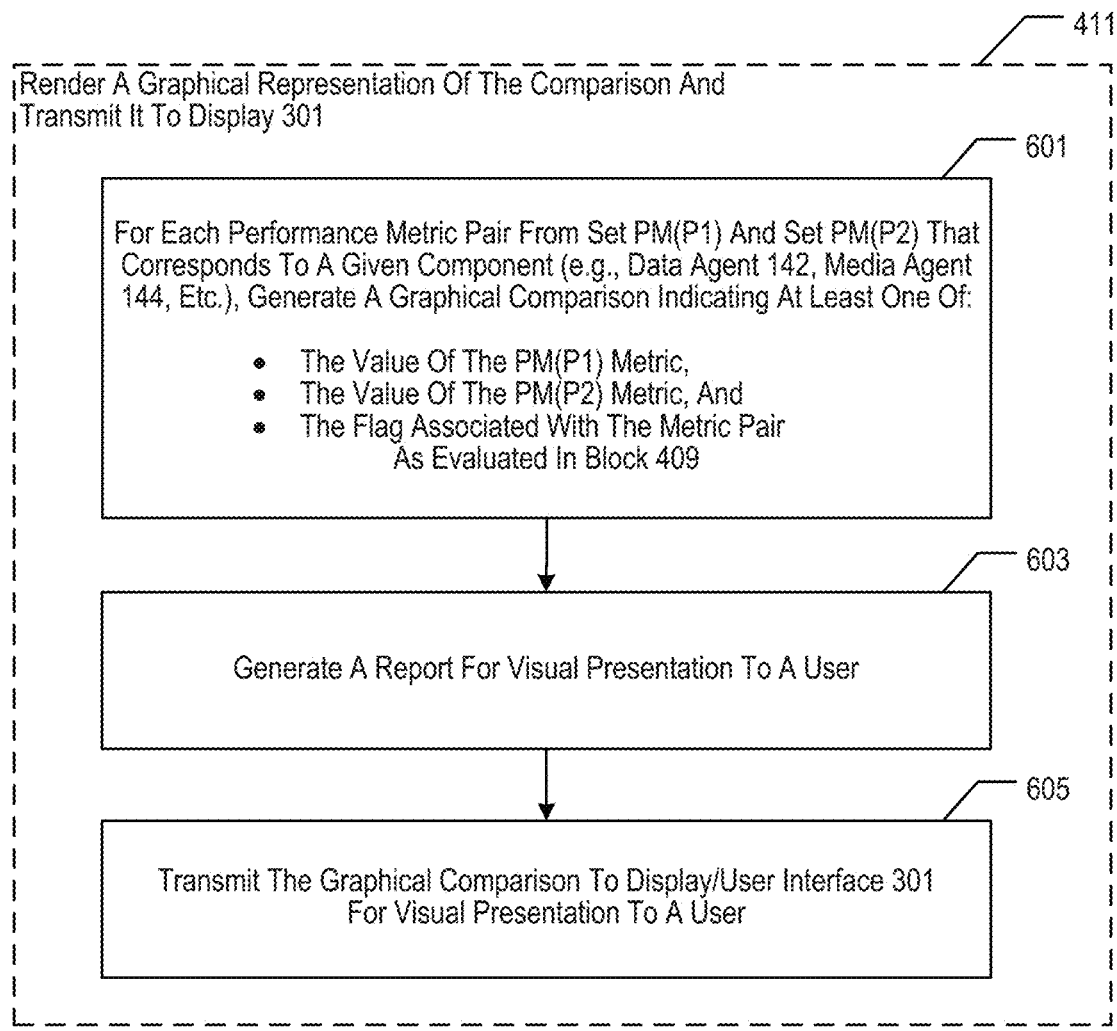
FIG. 6 depicts some salient operations of block 411 in method 400.

FIG. 6 depicts some salient sub-operations of block 411 in method 400, according to the exemplary embodiment.

At block 601, for each performance metric pair from set PM(P1) and set PM(P2) that corresponds to a given data agent 142 or media agent 144, a graphical comparison is generated that indicates at least one of:
The value of the metric in PM(P1), i.e., in period P1;
The value of the metric in PM(P2), i.e., in period P2;
The flag associated with the metric pair, as determined in block 409, e.g., "needs attention," "critical," or "normal," or "improvement," etc.

At block 603, when all metric pairs have been processed for graphical rendering, a full report is generated for visual presentation to a user and control passes to block 605. The format and rendering details of the full report shall be left to the discretion of the implementers of system 200.

At block 605, the graphical comparison that was rendered in the preceding blocks is transmitted to display/user interface 321 for visual presentation to the user. Illustrative examples of visual presentations on display 321 appear in FIGS. 8A and 8B herein.

Figure 7:
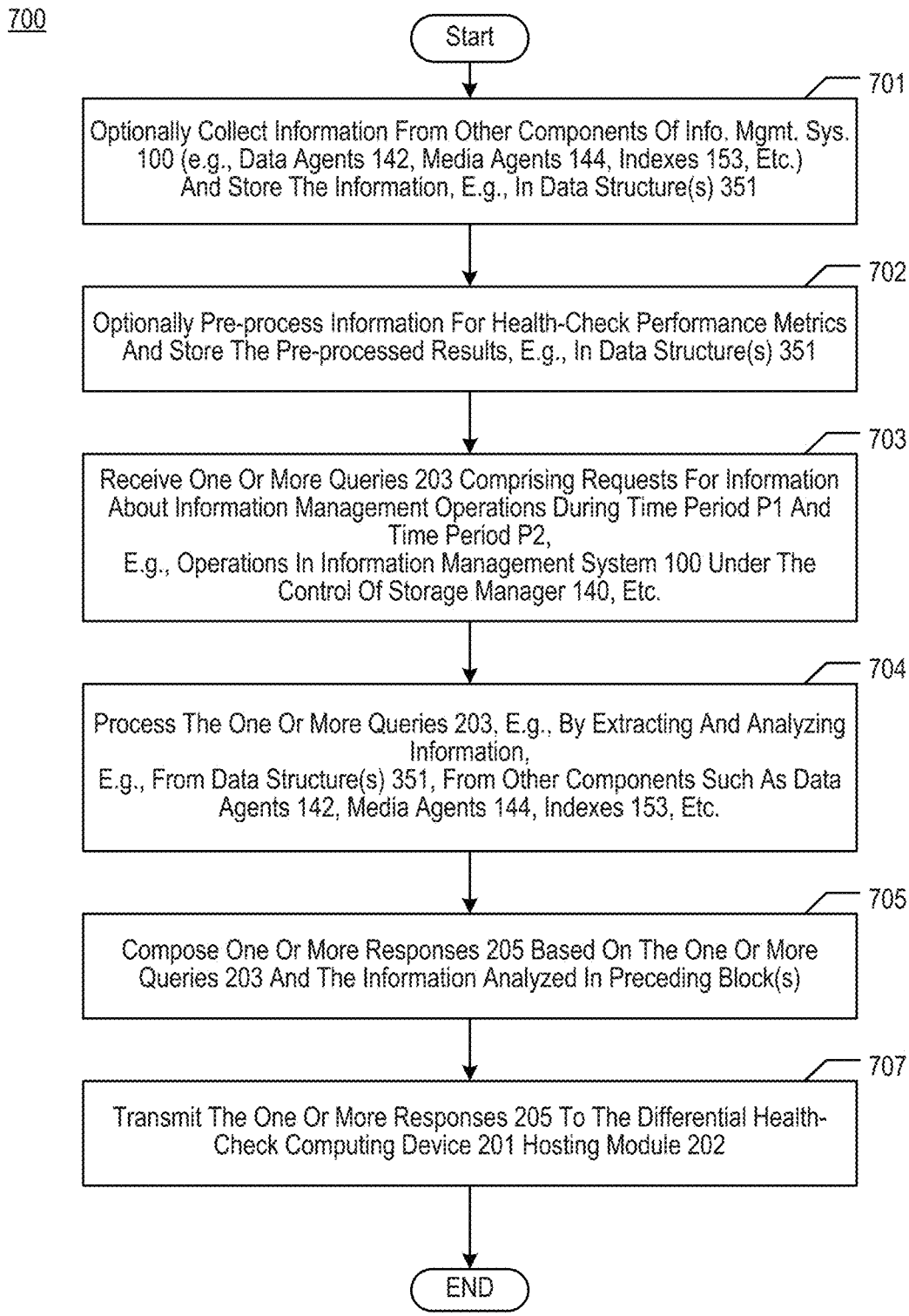
FIG. 7 depicts some salient operations of exemplary method 700.

FIG. 7 depicts some salient operations of method 700 according to the exemplary embodiment of the present invention. According to the exemplary embodiment, metrics reporting interface module 350 in storage manager 140, illustratively executing on the computing device that hosts storage manager 140, performs the salient tasks of method 700 as described in further detail below. In some embodiments, metrics reporting interface module 350 is a component of and executes within storage manager 140. Metrics reporting interface module 350 is specially purposed to support differential health-checking.

Thus, it will clear to those having ordinary skill in the art, after reading the present disclosure, how to make and use embodiments wherein module 350 performs data extraction/processing in response to queries 203; or wherein module 350 additionally pre-processes some data as it arrives at storage manager 140 in support of differential health-checking, e.g., aggregating data; or wherein module 350 pro-actively queries system components outside storage manager 140 prior to receiving queries 203 for data that is relevant to differential health-checking, e.g., collecting throughput data from data agents 142, collecting capacity data from media agents 144, etc.; or any combination thereof. Depending on the implementation of differential health-check system 200, module 350 may be limited to data extraction/processing in response to queries 203, or, alternatively, may perform any number of predictive operations, such as pro-active data collection and/or pre-processing in anticipation of future queries 203.

At block 701, which is optional, information is collected from data agents 142, and/or media agents 144, and/or indexes 153, and/or other components of system 100—and the information is stored, e.g., in data structure(s) 351, or in another data structure that is associated with storage manager 140. In some embodiments, the information may be collected from a remote server and/or transmitted to and stored at the remote server after it is obtained by the storage manager 140.

At block 702, which is optional, information is pre-processed for differential health-checking and stored, e.g., in data structure(s) 351, or in another data structure that is associated with storage manager 140. For example, daily throughput metrics are calculated for each data agent 142, etc., without limitation. In some embodiments, the information may be collected from a remote server and/or transmitted to the remote server after it is obtained by the storage manager 140.

At block 703, one or more queries 203 are received, illustratively from module 202. The queries 203 comprise requests for information about information management system 100 during time period P1 and time period P2, e.g., about operations in information management system 100, about operations under the control of storage manager 140, about components under the control of storage manager 140, etc. As described in more detail in reference to blocks 405 and 407, the queries are received via electronic communications between storage manager 140 and module 202.

At block 704, the one or more received queries 203 are processed. This is accomplished by accessing and extracting available information, e.g., from management database 146, such as information stored in data structure(s) 351; information stored in data agents 142; information stored in media agents 144 or in associated indexes 153; information stored in other components of system 100, etc., or any combination thereof, without limitation. Thus the information may be available locally or may be retrieved from other components in the information management system under the control of storage manager 140, such as the targeted component itself or from associated indexes or other data structures that store the relevant information. For example, storage manager 140 may have information about a given data agent stored locally in data structure 351, or elsewhere in management database 146, or it may poll the data agent for information, etc.

Furthermore, after extracting all the appropriate information, module 350 analyzes the information according to the query in order to formulate a proper response, for example, filtering out data outside time periods P1 and P2, reducing available data, summarizing data according to the received queries, etc. The purpose of this analysis is to gather information that is responsive to the queries.

At block 705, one or more responses 205 are composed, based on the one or more queries 203 and the analysis that was performed in the preceding blocks. Here, module 350 takes the results of the preceding analysis and generates responses to the queries in the format and content that renders the responses 205 responsive to the queries 203. The detailed organizational scheme and formatting performed here is left to the implementers of system 200. For example, the responses may comprise packet headers, unique identifiers, and other aspects suitable for electronic communications between storage manager 140 and module 202.

At block 707, the one or more responses 205 are transmitted to module 202 via electronic communications from storage manager 140, as described in more detail in reference to blocks 405 and 407.

It will be clear to those having ordinary skill in the art, after reading the present disclosure, how to make and use alternative embodiments wherein method 700 is differently organized, executed, sequenced, sub-divided into sub-operations, distributed among different modules and/or different computing platforms. It will be further clear, after reading the present disclosure, that any number, variations, and arrangements of different data extraction, data collection, and/or information pre-processing operations may be configured in differential health-check system 200, as defined by the implementers of the system.

FIG. 8A depicts an exemplary visual presentation on display/user interface 321 that reports on jobs executed by data agents 142 in time periods P1 and P2.

Event boundary 211-1 is shown as Jan. 7, 2013, i.e., illustratively based on a triggering event that is a system upgrade that occurred on that date.

The user-selected report timeframe 303 is to compare pre-upgrade and post-upgrade intervals of 3 days. Hence the time period P1 may be defined here as the three calendar days preceding the Jan. 7, 2013 upgrade—data for this period is shown in the lighter color bars, as indicated in the upper right legend. Furthermore, the time period P2 may be defined here as the three calendar days that follow the Jan. 7, 2013 upgrade—data for this period is shown in darker color bars, as indicated in the upper right legend.

A fixed threshold of 15% is illustrated here. Performance deterioration of less than the 15% threshold in period P2 as compared to period P1 is flagged in a lighter background color behind the value bars, indicating "Needs Attention." Performance deterioration that passes the 15% threshold in period P2 as compared to period P1 is flagged separately in a darker background color behind the value bars, indicating "Critical."

The illustrative presentation/report is presented in tabular form. Column 801 lists the plurality of data agents 142 being reported on. Examples of data agents shown here include without limitation:
Active Directory
AIX File System
Exchange Compliance Archiver
Exchange Mailbox Archiver
SQL Server
Windows 2003 32-bit File System
Windows 2003 64-bit File System
Windows File System.
Any type and any number of data agents may be analyzed and reported on according to the illustrative embodiment.

Column 802 reports on a performance metric of the number of completed jobs in period P1 and period P2, respectively. Illustratively, no change is measured as to data agents "Active Directory" and "AIX File System" and "Windows File System" in respect to this performance metric. Illustratively, data agents "Exchange Compliance Archiver," "SQL Server," "Windows 2003 32-bit File System," and "Windows 2003 64-bit File System" all are flagged as needing attention in respect to this performance metric. Illustratively, data agent "Exchange Mailbox Archiver" is flagged as "critical" in respect to this performance metric.

Column 803 reports on a performance metric of data agent jobs completed with errors, or errored jobs, in period P1 and period P2, respectively. Agents "SQL Server" and "Windows 2003 32-bit File System" are flagged as critical.

Column 804 reports on a performance metric of the average throughput of data agent jobs, measured in GB/Hr. Agent "SQL Server" is flagged as needing attention. Agents "Active Directory," Windows 2003 32-bit File System," and "Windows 2003 64-bit File System" are flagged as critical.

Column 805 reports on a performance metric of the average time of data agent jobs, measured in minutes. Agent "Active Directory" is flagged as needing attention. Agent "Exchange Compliance Archiver" is flagged as critical.

Column 806 reports on a performance metric of the average number of attempted jobs by data agent. No performance deterioration is reported in this column.

Thus, a deterioration in performance of certain data agents, some of it flagged as critical, has been detected by this exemplary differential health-check as executed by system 200.

It is to be understood that the present figure depicts only one possible example according to the exemplary embodiment, and that any number of variations and different arrangements and presentations are possible within the scope of the present invention, e.g., flagging performance improvement relative to the triggering event.

FIG. 8B depicts an exemplary visual presentation on display/user interface 321 that reports from indexes 153 that are associated with respective media agents 144 in time periods P1 and P2.

Event boundary 211-1 is shown as Jan. 7, 2013, i.e., illustratively based on a triggering event that is a system upgrade that occurred on that date. The presentation scheme is analogous to the one described in FIG. 8A, including the user-selected report timeframe 303.

Column 851 lists the plurality of media agents 144 being reported on, each having an identifier (e.g., name) as it appears within system 100.

Column 852 reports on a performance metric of the number of jobs that were restored via the media agent as reported by the associated index 153. All count values are reported as zero and there is no change in performance as between time period P1 and time period P2.

Column 853 reports on a performance metric of the total data storage capacity available to the media agent, measured in GB. No change is reported as between time period P1 and time period P2.

Column 854 reports on a performance metric of the total disk usage of the media agent in the time period P1 versus P2, measured in GB. Media agent MA14402 is reported as critical, based on a substantial increase in usage in period P2 (247.18 GB) versus the pre-upgrade P1 period (81.86 GB) that exceeds the 15% threshold. The other media agents are shown with less disk usage in period P2 versus P1 and no attention/criticality flag is raised.

Column 855 reports on a performance metric of the total free disk space available to the media agent in the time period, measured in GB. Media agents MA14401 and MA14404 are flagged as critical, because of a substantial increase in reported free disk space in the post-upgrade time period P2 as compared to the pre-upgrade time period P1 that exceeds the 15% threshold.

As with FIG. 8A, is to be understood that FIG. 8B depicts only one possible example according to the exemplary embodiment, and that any number of variations and different arrangements and presentations are possible within the scope of the present invention.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method comprising:
   at a computing device comprising one or more hardware processors and computer memory:
   receiving a request for a report of storage operations performed by a component in a storage management system, wherein the component comprises one or more of: a storage manager, a data agent, a media agent, and data storage;
   identifying a first time period comprising a first plurality of storage operations performed by the component in the storage management system, wherein the first time period occurred before a trigger event;
   identifying a second time period that occurred after completion of the trigger event, wherein the second time period comprises a second plurality of storage operations performed by the component in the storage management system;

determining a first value of a first performance metric for the component performing the first plurality of storage operations;

determining a second value of the first performance metric for the component performing the second plurality of storage operations;

based on a comparison of the second value of the first performance metric to the first value of the first performance metric, detecting a change in performance of the component in the storage management system after the completion of the trigger event; and in response to the request, reporting the change in the performance of the component after the completion of the trigger event.

2. The method of claim 1, wherein the trigger event is one of: an upgrade to at least part of the storage management system, a disaster recovery operation of at least a part of the storage management system, a change in configuration to at least part of the storage management system, a replacement of equipment of at least part of the storage management system, an upgrade of the component, a new version of the component, a change in configuration of the component, and a scheduled event.

3. The method of claim 1, wherein:

the data agent arranges primary data and transmits the arranged primary data to a media agent, and wherein the data agent executes on a computing device comprising one or more hardware processors and computer memory, the media agent creates one or more secondary copies based on the arranged primary data received from the data agent and stores the one or more secondary copies to data storage, wherein the media agent executes on a computing device comprising one or more hardware processors and computer memory, and the storage manager controls storage operations in the storage management system and executes on a computing device comprising one or more hardware processors and computer memory.

4. The method of claim 1, wherein identifying the second plurality of storage operations comprises generating one or more queries to a storage manager that controls the storage management system, wherein the one or more queries comprises at least one of: a number of jobs completed by a data agent, throughput metrics, time metrics for the completed jobs, a count of the number of jobs attempted by each data agent, job count for each media agent, total data storage capacity available to each media agent, total disk usage accessed by each media agent, and free disk space available to each media agent, and wherein the storage manager executes on a computing device comprising one or more hardware processors and computer memory.

5. The method of claim 1, wherein the comparison of the second value of the first performance metric to the first value of the first performance metric excludes a time period representing the trigger event.

6. The method of claim 1, wherein the change in the performance of the component after the completion of the trigger event indicates a performance degradation.

7. The method of claim 1, further comprising:

flagging at least of the first value and the second value based on exceeding pre-established threshold value of performance.

8. The method of claim 1, wherein the change in the performance of the component is below a pre-established threshold value, and further comprising: reporting the performance of the component after the completion of the trigger event as normal.

9. The method of claim 1, further comprising querying a storage manager for the first plurality of storage operations and for the second plurality of storage operations, wherein the storage manager executes on a computing device comprising one or more hardware processors and computer memory.

10. The method of claim 1, wherein the first value and the second value of the first performance metric are based on data extracted by a storage manager from one or more media agent components in the storage management system, wherein each of the one or more media agent components participated in at least one of the first plurality of storage operations, and wherein each of the one or more media agent components executes on a computing device comprising one or more hardware processors and computer memory, and wherein the storage manager controls the first plurality of storage operations and the second plurality of storage operations, and wherein the storage manager executes on a computing device comprising one or more hardware processors and computer memory.

11. A system comprising:

a computing device comprising one or more hardware processors and computer memory, wherein the computing device is configured to:

receive a request for a report about storage operations performed by a component in a storage management system, wherein the component comprises one or more of: a storage manager, a data agent, a media agent, and data storage;

identify a first time period comprising a first plurality of storage operations performed by the component in the storage management system, wherein the first time period occurred before a trigger event;

identify a second time period that occurred after completion of the trigger event, wherein the second time period comprises a second plurality of storage operations performed by the component in the storage management system;

determine a first value of a first performance metric for the component performing the first plurality of storage operations;

determine a second value of the first performance metric for the component performing the second plurality of storage operations;

based on a comparison of the second value of the first performance metric to the first value of the first performance metric, detect a change in performance of the component in the storage management system after the completion of the trigger event; and in response to the request, report on the performance of the component after the completion of the trigger event.

12. The system of claim 11, wherein the trigger event is one of: an upgrade to at least part of the storage management system, a disaster recovery operation of at least a part of the storage management system, a change in configuration to at least part of the storage management system, a replacement of equipment of at least part of the storage management system, an upgrade of the component, a new version of the component, a change in configuration of the component, and a scheduled event.

13. The system of claim 11, wherein the storage manager controls storage operations in the storage management system, including the first plurality of storage operations and the second plurality of storage operations, and wherein the storage manager executes on a computing device comprising one or more hardware processors and computer memory.

14. The system of claim 11, wherein identifying the second plurality of storage operations comprises generating one or more queries to a storage manager that controls the storage management system, wherein the one or more queries comprises at least one of: a number of jobs completed by a data agent, throughput metrics, time metrics for the completed jobs, a count of the number of jobs attempted by each data agent, job count for each media agent, total data storage capacity available to each media agent, total disk usage accessed by each media agent, and free disk space available to each media agent, and wherein the storage manager executes on a computing device comprising one or more hardware processors and computer memory.

15. The system of claim 11, wherein the comparison of the second value of the first performance metric to the first value of the first performance metric excludes a time period representing the trigger event.

16. The system of claim 11, wherein the change in the performance of the component after the completion of the trigger event indicates a performance degradation.

17. The system of claim 11, wherein the computing device is further configured to:
  flag at least of the first value and the second value based on exceeding pre-established threshold value of performance.

18. The system of claim 11, wherein the change in the performance of the component is below a pre-established threshold value, and wherein the computing device is further configured to: report the performance of the component after the completion of the trigger event as normal.

19. The system of claim 11, wherein the computing device is further configured to:
  query a storage manager for the first plurality of storage operations and for the second plurality of storage operations, and wherein the storage manager executes on a computing device comprising one or more hardware processors and computer memory.

20. The system of claim 11, wherein the first value and the second value of the first performance metric are based on data extracted by a storage manager from one or more media agent components in the storage management system,
  wherein each of the one or more media agent components participated in at least one of the first plurality of storage operations, and wherein each of the one or more media agent components executes on a computing device comprising one or more hardware processors and computer memory, and
  wherein the storage manager controls the first plurality of storage operations and the second plurality of storage operations, and wherein the storage manager executes on a computing device comprising one or more hardware processors and computer memory.

* * * * *